US009883483B2

(12) United States Patent
Bontu et al.

(10) Patent No.: US 9,883,483 B2
(45) Date of Patent: Jan. 30, 2018

(54) SYSTEMS AND METHODS FOR COEXISTENCE OF MBMS AND VOIP SERVICES

(71) Applicant: Telefonaktiebolaget L M Ericsson (publ), Stockholm (SE)

(72) Inventors: Chandra Sekhar Bontu, Nepean (CA); Prabaharan Kanesalingam, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 196 days.

(21) Appl. No.: 14/490,544

(22) Filed: Sep. 18, 2014

(65) Prior Publication Data
US 2015/0381463 A1    Dec. 31, 2015

Related U.S. Application Data

(63) Continuation of application No. 14/384,853, filed as application No. PCT/IB2014/064029 on Aug. 22, 2014.

(Continued)

(51) Int. Cl.
*H04L 12/26* (2006.01)
*H04W 72/00* (2009.01)
(Continued)

(52) U.S. Cl.
CPC ........ *H04W 72/005* (2013.01); *H04W 76/048* (2013.01); *H04W 24/02* (2013.01); *Y02B 60/50* (2013.01)

(58) Field of Classification Search
CPC ...... H04W 24/02; H04W 72/08; H04L 12/26; H04L 43/16
See application file for complete search history.

(56) References Cited

U.S. PATENT DOCUMENTS 8,181,093 B2    5/2012  Reznik et al.
8,300,664 B2   10/2012  Koskinen
(Continued)

FOREIGN PATENT DOCUMENTS

WO    2009119477 A1    10/2009
WO    2013190364 A2    12/2013
WO    2014035074 A1     3/2014

OTHER PUBLICATIONS

Invitation to Pay Additional Fees and Partial International Search Report for PCT/IB2014/064029, dated Mar. 5, 2015, 5 pages.
(Continued)

*Primary Examiner* — Anez Ebrahim
(74) *Attorney, Agent, or Firm* — Withrow & Terranova, PLLC

(57) ABSTRACT

Systems and methods for coexistence of Multimedia Broadcast Multicast Services (MBMS) and Voice over Internet Protocol (VoIP) services are disclosed. In one embodiment, a method of operation of a network node in a cellular communications network is provided. The method includes determining a number of MBMS subframes for an MBMS allocation period. The method also includes, for each MBMS subframe of the number of MBMS subframes, assigning a frame number and a subframe number for the MBMS subframe such that a probability of a VoIP packet transmission during the MBMS subframe is mitigated. By mitigating the probability that a VoIP packet transmission occurs during a scheduled MBMS subframe, a VoIP user equipment (UE) may miss fewer packets and/or experience reduced battery drain.

26 Claims, 24 Drawing Sheets

Related U.S. Application Data

(60) Provisional application No. 62/017,048, filed on Jun. 25, 2014.

(51) Int. Cl.
*H04W 76/04* (2009.01)
*H04W 24/02* (2009.01)

(56) References Cited

U.S. PATENT DOCUMENTS

| | | | |
|---|---|---|---|
| 8,699,397 | B2 | 4/2014 | Wang et al. |
| 8,811,253 | B2 | 8/2014 | Damnjanovic et al. |
| 8,953,998 | B2 | 2/2015 | Wu |
| 9,019,888 | B2 | 4/2015 | Jalil et al. |
| 2008/0056219 | A1 | 3/2008 | Venkatachalam |
| 2009/0175186 | A1 | 7/2009 | Du et al. |
| 2010/0034127 | A1* | 2/2010 | Iwamura ........... H04W 52/0225 370/311 |
| 2010/0150114 | A1* | 6/2010 | Che ................... H04L 1/0026 370/336 |
| 2011/0128903 | A1 | 6/2011 | Futaki et al. |
| 2011/0194477 | A1 | 8/2011 | Damnjanovic et al. |
| 2011/0205948 | A1 | 8/2011 | Chen et al. |
| 2011/0268077 | A1 | 11/2011 | Wan et al. |
| 2012/0082140 | A1 | 4/2012 | Lin et al. |
| 2012/0120828 | A1* | 5/2012 | Anderson ......... H04W 52/0225 370/252 |
| 2012/0281566 | A1* | 11/2012 | Pelletier ............. H04W 76/046 370/252 |
| 2013/0051301 | A1 | 2/2013 | Xu |
| 2013/0070635 | A1 | 3/2013 | Suo et al. |
| 2013/0208587 | A1 | 8/2013 | Bala et al. |
| 2013/0301420 | A1 | 11/2013 | Zhang et al. |
| 2014/0241232 | A1 | 8/2014 | Damji et al. |
| 2015/0109972 | A1 | 4/2015 | Khoryaev et al. |

OTHER PUBLICATIONS

Samsung, "R2-097077: DRX Efficiency of VoIP," 3rd Generation Partnership Project (3GPP), TSG-RAN2 #68, Nov. 9-13, 2009, 2 pages, Jeju, Korea.

International Search Report and Written Opinion for PCT/IB2014/064029, dated May 22, 2015, 17 pages.

Author Unknown, "Technical Specification Group Radio Access Network; Evolved Universal Terrestrial Radio Access (E-UTRA); Radio Resource Control (RRC); Protocol specification (Release 12)," Technical Specification 36.331, Version 12.1.0, 3GPP Organizational Partners, Mar. 2014, 356 pages.

Non-Final Office Action for U.S. Appl. No. 14/384,853, dated Jul. 5, 2016, 13 pages.

Final Office Action for U.S. Appl. No. 14/384,853, dated Nov. 21, 2016, 11 pages.

\* cited by examiner

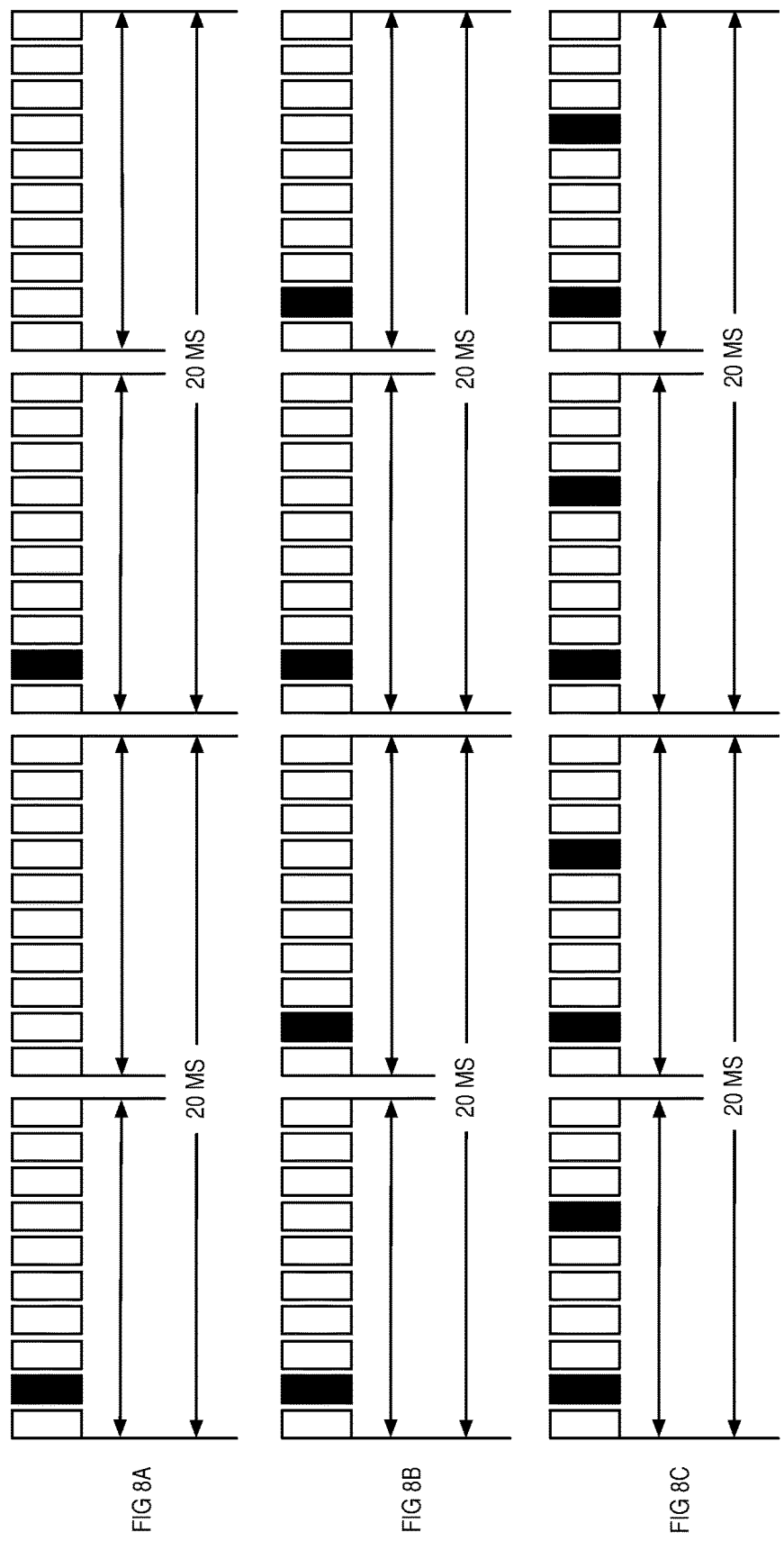

```
-- ASN1START

MBSFN-SubframeConfig ::=      SEQUENCE {
    radioframeAllocationPeriod    ENUMERATED {n1, n2, n4, n8, n16, n32},
    radioframeAllocationOffset    INTEGER (0 .. 7),
    subframeAllocation            CHOICE {
        oneFrame                      BIT STRING (SIZE(6)),
        fourFrames                    BIT STRING (SIZE(24))
    }
}

-- ASN1STOP
```

FIG. 9A

```
-- ASN1START

MBSFNAreaConfiguration-r9 ::=     SEQUENCE {
    commonSF-Alloc-r9                 CommonSF-AllocPatternList-r9,
    commonSF-AllocPeriod-r9           ENUMERATED {
                                          rf4,rf8,rf16, rf32, rf64, rf128, rf256},
    pmch-InfoList-r9,
    nonCriticalExtension              MBSFNAreaConfiguration-v930-IEs OPTIONAL
}

MBSFN-AreaConfiguration-v930-IEs ::= SEQUENCE {
    lateNonCriticalExtension             OCTET STRING                    OPTIONAL,
    nonCriticalExtension                 SEQUENCE {}                     OPTIONAL
}

CommonSF-AllocPatternList-r9 ::=    SEQUENCE (SIZE (1..maxMBSFN-Allocations)) OF MBSFN-SubframeConfig

-- ASN1STOP
```

SYSTEMS AND METHODS FOR COEXISTENCE OF MBMS AND VOIP SERVICES

RELATED APPLICATIONS

This application is a continuation of U.S. patent application Ser. No. 14/384,853, filed Sep. 12, 2014, now U.S. Pat. No. 9,681,441, which is a 35 U.S.C. § 371 national phase filing of International Application No. PCT/IB2014/064029, filed Aug. 22, 2014, which claims the benefit of provisional patent application Ser. No. 62/017,048, filed Jun. 25, 2014, the disclosures of which are incorporated herein by reference in their entirety.

FIELD OF THE DISCLOSURE

The present disclosure relates to coexistence of Multimedia Broadcast Multicast Service (MBMS) and Voice over Internet Protocol (VoIP) in a cellular communications network.

BACKGROUND

Multimedia Broadcast Multicast Services (MBMS) is a point-to-multipoint interface specification for cellular communication networks. MBMS is designed to provide efficient delivery of broadcast and multicast services within a particular geographical area. For broadcast transmission across multiple cells, MBMS defines transmission via single-frequency network configurations. Some potential applications for MBMS may include mobile television, radio broadcasting, and emergency alerts. As specified in 3GPP TS 36.331, "Radio Resource Control", v. 12.1.0, when the MBMS service is enabled, some of the available subframes within the radio frames are periodically allocated to MBMS. The periodicity can be set to one, two, four, eight, sixteen, or thirty two radio frames. Normally, MBMS subframe allocation is semi-statically configured. The MBMS subframe pattern is indicated in a System Information Block 2 (SIB2) broadcast message as part of the MBMS Single Frequency Network (MBSFN)-Subframe Configuration Information Element (IE). User Equipment devices (UEs) that are not interested in the multicast service skip the MBMS subframes by just reading the Physical Downlink Common Control Channel (PDCCH) for any uplink grants.

MBMS subframes can be configured based on the expected MBMS service load. These MBMS subframes can be configured across a decided MBMS allocation period in any order or pattern. In this regard, FIG. 1 shows an example MBMS subframe allocation following a Distributed Assignment and a Dense Assignment. In a Distributed Assignment, the subframes are allocated across many frames. In a Dense Assignment, many of the subframes are allocated in one frame with less allocated in other frames.

If the cellular communication network also implements Voice over Internet Protocol (VoIP) (e.g., Voice over Long Term Evolution (VoLTE)), the VoIP Radio Access Bearers (RABs) typically transmit and receive packets every 20 milliseconds (ms) during a talk spurt. In other implementations, the VoIP RABs transmit every 40 ms during the talk spurt when two packets are bundled together. To conserve the battery power of the UE, VoIP users may operate with Discontinuous Reception (DRX) enabled. Typically the DRX period is set to the same periodicity as the VoIP RAB with the DRX ON TIME set to a minimum number of subframes to receive the VoIP packets. These DRX settings allow a UE to receive the VoIP RAB transmissions while conserving power by not receiving during other times.

When some of the subframes are already allocated for MBMS service, VoIP RABs cannot be received during those subframes. If these MBMS scheduled subframes interfere with the scheduled VoIP packet receptions, this may result in the VoIP UEs experiencing degradation in quality due to missed packets. These MBMS allocated subframes may also result in additional battery drain at the UE if the UE must maintain a longer DRX ON TIME in order to receive the VoIP RAB reception. As such, there is a need for improved MBMS scheduling and DRX parameter selection.

SUMMARY

Systems and methods for coexistence of Multimedia Broadcast Multicast Services (MBMS) and Voice over Internet Protocol (VoIP) services are disclosed. In one embodiment, a method of operation of a network node in a cellular communications network is provided. The method includes determining a number of MBMS subframes for an MBMS allocation period. The method also includes, for each MBMS subframe of the number of MBMS subframes, assigning a frame number and a subframe number for the MBMS subframe such that a probability of a VoIP packet transmission during the MBMS subframe is mitigated. By mitigating the probability that a VoIP packet transmission occurs during a scheduled MBMS subframe, a VoIP User Equipment (UE) may miss fewer packets and/or experience reduced battery drain.

In one embodiment, determining the number of MBMS subframes comprises determining the number of MBMS subframes for the MBMS allocation period based on an MBMS load value for the MBMS allocation period. In one embodiment, the MBMS load value is determined based on the radio bandwidth required to support MBMS services with acceptable service quality.

In one embodiment, assigning the frame number and the subframe number for the MBMS subframe includes assigning the frame number with a periodicity equal to the periodicity of the VoIP packet transmission and assigning the subframe number for each MBMS subframe a fixed subframe number, the fixed subframe number being the same for each MBMS subframe.

In one embodiment, assigning the frame number and the subframe number for the MBMS subframe includes, for each MBMS subframe in a first subset of the number of MBMS subframes, assigning the frame number with a periodicity equal to the periodicity of the VoIP packet transmission and assigning the subframe number for each MBMS subframe a fixed subframe number. The method also includes, for each MBMS subframe in a second subset of the number of MBMS subframes, assigning the frame number with a periodicity equal to the periodicity of the VoIP packet transmission and offset and assigning the subframe number for each MBMS subframe the fixed subframe number. The fixed subframe number is the same for each MBMS subframe in both the first and second subsets of the number of MBMS subframes. In one embodiment, for each MBMS subframe in the second subset of the number of MBMS subframes, assigning the frame number includes assigning the frame number with a periodicity equal to the periodicity of the VoIP packet transmission and offset by half of a VoIP period.

In one embodiment, assigning the frame number and the subframe number for the MBMS subframe also includes, for each MBMS subframe in a third subset of the number of MBMS subframes, assigning the frame number with a periodicity equal to the periodicity of the VoIP packet transmission and assigning the subframe number for each MBMS subframe a second fixed subframe number. The second fixed subframe number is the same for each MBMS subframe in the third subset of the number of MBMS subframes.

In one embodiment, assigning the frame number and the subframe number for the MBMS subframe includes assigning the frame number to be equal to $$\mathrm{mod}\left(\Sigma_{k=0}^{P_2}\left\lfloor\frac{i}{2^k}\right\rfloor\frac{P}{2^{k+1}}, P\right),$$

where i is the number of the MBMS subframe, P is the MBMS allocation period and $P_2$ is equal to $\log_2 P$ and assigning the subframe number for each MBMS subframe based on the floor of (i/P). In one embodiment, assigning the subframe number for each MBMS subframe includes assigning the subframe number as x(floor of (i/P)) where x is {1, 6, 3, 8, 2, 7}. In another embodiment, assigning the subframe number for each MBMS subframe comprises assigning the subframe number as x(floor of (i/P)) where x is {3, 8, 9, 4, 7}.

In one embodiment, the periodicity of the VoIP packet transmission is 20 subframes. In another embodiment, the periodicity of the VoIP packet transmission is 40 subframes.

In one embodiment, a device is adapted to determine a number of MBMS subframes for an MBMS allocation period based on an MBMS load value for the MBMS allocation period. The device is also adapted to, for each MBMS subframe of the number of MBMS subframes, assign a frame number and a subframe number for the MBMS subframe such that a probability of a VoIP packet transmission during the MBMS subframe is mitigated.

In one embodiment, a network node in a cellular communications network includes a processor and a memory coupled to the processor. The memory contains instructions executable by the processor whereby the apparatus is operative to determine a number of MBMS subframes for an MBMS allocation period based on an MBMS load value for the MBMS allocation period and, for each MBMS subframe of the number of MBMS subframes, assign a frame number and a subframe number for the MBMS subframe such that a probability of a VoIP packet transmission during the MBMS subframe is mitigated.

In one embodiment, a device includes a determining module operative to determine a number of MBMS subframes for an MBMS allocation period based on an MBMS load value for the MBMS allocation period. The device also includes an assignment module operative to, for each MBMS subframe of the number of MBMS subframes, assign a frame number and a subframe number for the MBMS subframe such that a probability of a VoIP packet transmission during the MBMS subframe is mitigated.

In one embodiment, a method of operation of a network node in a cellular communications network includes obtaining a pattern of special subframes. The method also includes receiving a request for a VoIP Radio Access Bearer (RAB), from a user equipment, UE, and determining one or more discontinuous reception, DRX, parameters for the VoIP RAB based on the pattern of special subframes.

In one embodiment, determining the one or more DRX parameters for the VoIP RAB includes determining the one or more DRX parameters for the VoIP RAB based on the pattern of special subframes such that a performance metric is optimized. In one embodiment, determining the one or more DRX parameters for the VoIP RAB includes determining the DRX offset parameter for the VoIP RAB based on the pattern of special subframes.

In one embodiment, determining the DRX offset parameter for the VoIP RAB includes determining the DRX offset parameter for the VoIP RAB based on the pattern of special subframes such that packet delay for the VoIP RAB is reduced as compared to the packet delay for the VoIP RAB with a DRX offset parameter not determined based on the pattern of special subframes.

In one embodiment, determining the DRX offset parameter for the VoIP RAB includes determining a DRX offset parameter for the VoIP RAB such that, for each special subframe in the pattern of special subframes, the DRX offset parameter will not coincide with the special subframe. In one embodiment, determining the DRX offset parameter for VoIP RAB includes determining the DRX offset parameter for the VoIP RAB such that the probability of subframe numbers which satisfy the criterion DRX offset=mod(subframe number, DRX period) being a special subframe is less than a threshold. In one embodiment, the threshold is defined based on the VoIP packet delay budget. In one embodiment, the threshold is dependent on the probability that the subframe numbers which satisfy the criterion DRX offset+n=mod(subframe number, DRX period) being a special subframe, where n is less than DRX ON TIME.

In one embodiment, determining the one or more DRX parameters for the VoIP RAB includes determining a DRX ON TIME parameter for the VoIP RAB based on the pattern of special subframes such that power use for the UE is reduced as compared to the power use for the UE with a DRX ON TIME parameter not determined based on the pattern of special subframes. In one embodiment, determining the DRX ON TIME parameter for the VoIP RAB includes determining the DRX ON TIME parameter for the VoIP RAB based on the pattern of special subframes such that power use for the UE is reduced as compared to the power use for the UE with the DRX ON TIME parameter not determined based on the pattern of special subframes.

In one embodiment, determining the DRX ON TIME parameter for the VoIP RAB includes determining whether one or more special subframes in the pattern of special subframes are scheduled to be received immediately after the VoIP RAB is scheduled to be received. If no special subframes in the pattern of special subframes are scheduled to be received immediately after the VoIP RAB is scheduled to be received, the DRX ON TIME parameter for the VoIP RAB is set to a minimum value for the DRX ON TIME parameter. If the one or more special subframes in the pattern of special subframes are scheduled to be received immediately after the VoIP RAB is scheduled to be received, the DRX ON TIME parameter for the VoIP RAB is set to a value greater than the minimum value for the DRX ON TIME parameter.

In one embodiment, determining the one or more DRX parameters for the VoIP RAB includes selecting a value for a DRX offset parameter for the VoIP RAB, determining whether the value for the DRX offset parameter for the VoIP RAB is suitable, and, in response to determining that the value is suitable, setting the DRX offset parameter for the VoIP RAB to the value. In one embodiment, selecting the value for the DRX offset parameter for the VoIP RAB includes randomly selecting the value for the DRX offset parameter for the VoIP RAB. In another embodiment, selecting the value for the DRX offset parameter for the VoIP RAB includes selecting the value for the DRX offset parameter for the VoIP RAB from a sorted list of values.

In one embodiment, determining whether the value for the DRX offset parameter for the VoIP RAB is suitable includes determining that the value is not suitable if the value corresponds to a special subframe in the pattern of special subframes. In one embodiment, determining the DRX offset parameter for VoIP RAB is suitable includes determining if the DRX offset parameter for the VoIP RAB such that the probability of subframe numbers which satisfy the criterion DRX offset=mod(subframe number, DRX period) being a special subframe is less than a threshold.

In one embodiment, determining whether the value for the DRX offset parameter for the VoIP RAB is suitable includes determining that the value is not suitable and the method further comprises determining whether setting the DRX offset parameter for the VoIP RAB to the value would cause an overload condition. In one embodiment, determining whether setting the DRX offset parameter for the VoIP RAB to the value would cause an overload condition includes determining a probability that setting the DRX offset parameter for the VoIP RAB to the value would cause a number of simultaneously active VoIP RABs to exceed a maximum number of simultaneously active VoIP RABs allowed and determining that the value is not suitable if the probability exceeds a threshold.

In one embodiment, determining the probability that setting the DRX offset parameter for the VoIP RAB to the value would cause the number of simultaneously active VoIP RABs to exceed the maximum number of simultaneously active VoIP RABs includes determining the probability that setting the DRX offset parameter for the VoIP RAB to the value would cause the number of simultaneously active VoIP RABs to exceed the maximum number based on a number of VoIP RABs having a DRX offset parameter set to the value and a voice activity factor that is the proportion of time a VoIP RAB is likely to be active. The voice activity factor can either be empirically calculated from the type of vocoder used, it can be learned from field measurements, or by some other method.

In one embodiment, the method also includes, in response to determining that the value for the DRX offset parameter for the VoIP RAB is not suitable, repeating the selecting, determining, and setting steps with a new value for the DRX offset parameter for the VoIP RAB that is different from the value. In one embodiment, the method also includes determining that no value is suitable for the DRX offset parameter for the VoIP RAB and, in response to determining that no value is suitable for the DRX offset parameter for the VoIP RAB, denying the request for the VoIP RAB.

In one embodiment, the sorted list of values is sorted by a probability that each value is suitable. In another embodiment, the sorted list of values is sorted by an average resource availability.

In one embodiment, the special subframes in the pattern of special subframes are selected from the group consisting of MBMS subframes, Almost Blank Subframes (ABS), New Carrier Type (NCT) subframes and subframes assigned for Positioning Reference Signals (PRS). In one embodiment, the cellular communications network is a Long Term Evolution (LTE) network.

In one embodiment, a device is adapted to obtain a pattern of special subframes, receive a request for a VoIP RAB from a UE, and determine one or more DRX parameters for the VoIP RAB based on the pattern of special subframes. In one embodiment, the device is adapted to determine the one or more DRX parameters for the VoIP RAB based on the pattern of special subframes such that a performance metric is optimized.

In one embodiment, a network node in a cellular communications network includes a processor and a memory coupled to the processor. The memory contains instructions executable by the processor whereby the apparatus is operative to obtain a pattern of special subframes, receive a request for a VoIP RAB from a UE, and determine one or more DRX parameters for the VoIP RAB based on the pattern of special subframes. In one embodiment, the apparatus is operative to determine the one or more DRX parameters for the VoIP RAB based on the pattern of special subframes such that a performance metric is optimized.

In one embodiment, a device includes a pattern obtaining module operative to obtain a pattern of special subframes, a VoIP RAB request receiving module operative to receive a request for a VoIP RAB from a UE, and a DRX parameter determining module operative to determine one or more DRX parameters for the VoIP RAB based on the pattern of special subframes. In one embodiment, the DRX parameter determining module is operative to determine one or more DRX parameters for the VoIP RAB based on the pattern of special subframes such that a performance metric is optimized.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIGS. 8A through 8C are diagrams depicting an example of scheduled MBMS subframes as a result of the process of FIG. 7 according to one embodiment of the present disclosure;

FIGS. 9A and 9B are information elements (IEs) to communicate MBMS scheduling information according to one embodiment of the present disclosure;

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Figure 1:
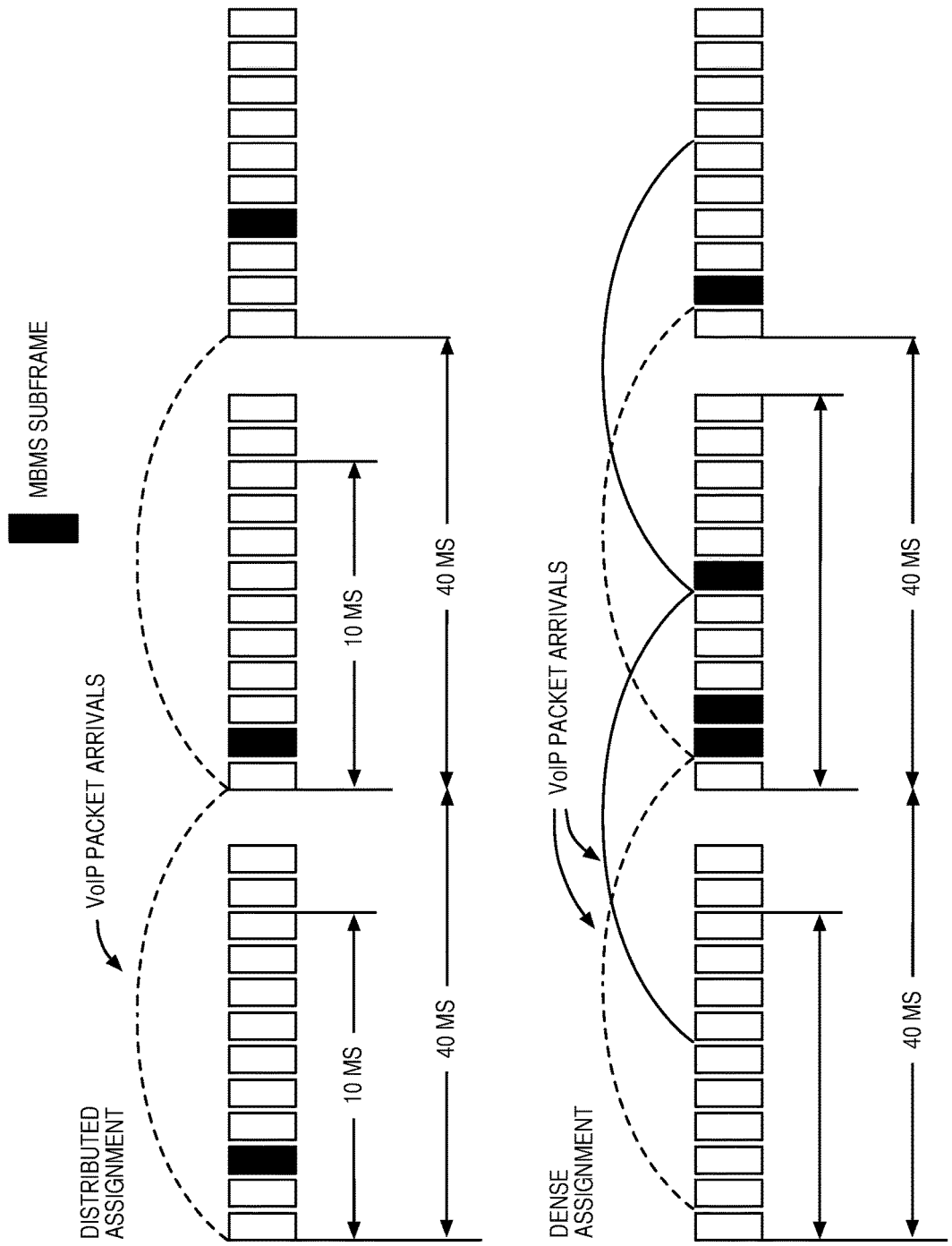
FIG. 1 is a diagram depicting an example Distributed Assignment of Multimedia Broadcast Multicast Services (MBMS) subframes and an example Dense Assignment of MBMS subframes.
Figure 2:
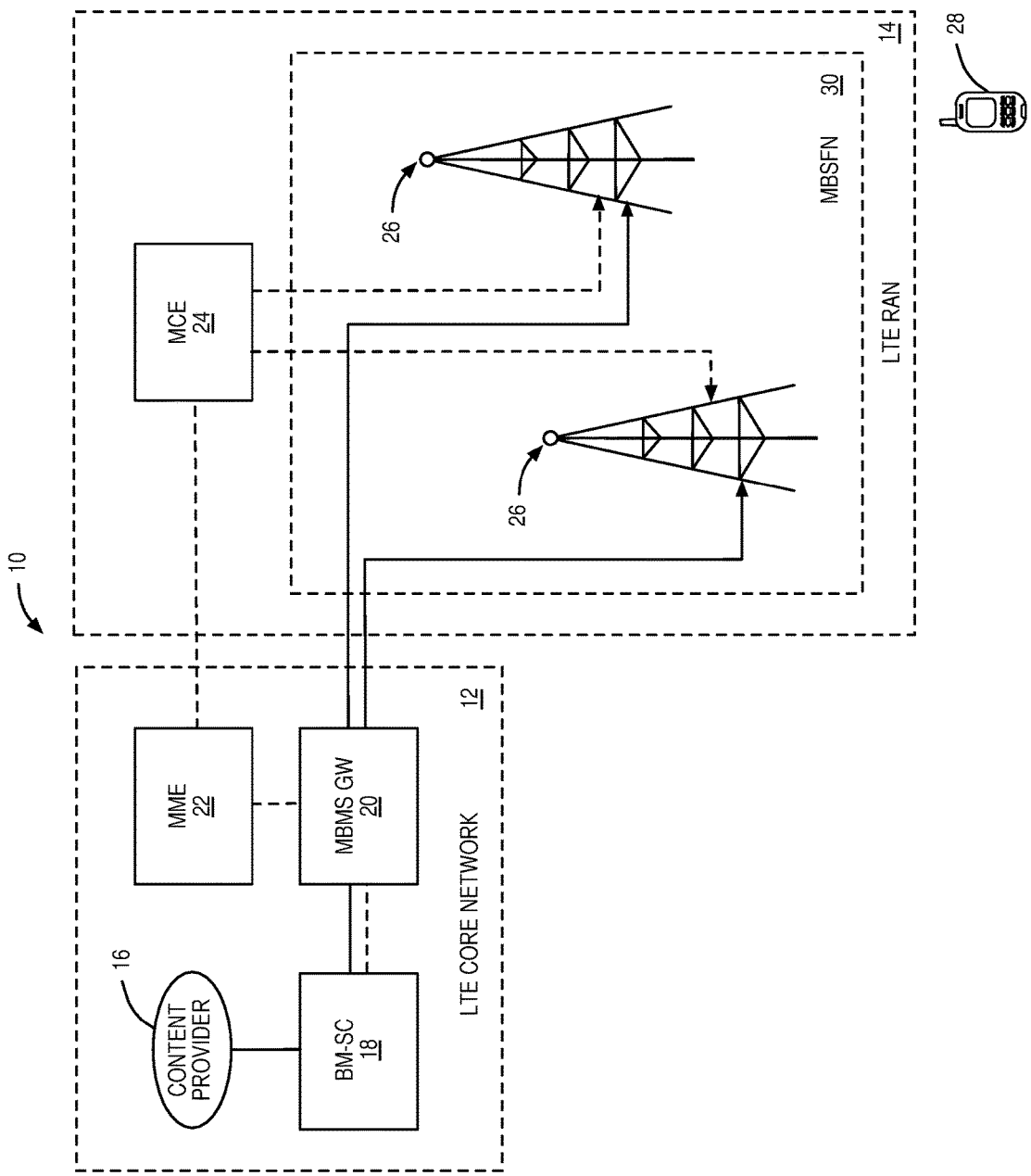
FIG. 2 is a block diagram of a cellular communication network including MBMS according to one embodiment of the present disclosure.

Systems and methods for coexistence of Multimedia Broadcast Multicast Services (MBMS) and Voice over Internet Protocol (VoIP) services are disclosed. In this regard, FIG. 2 is a block diagram of a cellular communication network 10 including MBMS according to one embodiment of the present disclosure. In FIG. 2, the cellular communication network 10 is a $3^{rd}$ Generation Partnership Project (3GPP) Long Term Evolution (LTE) cellular communications network. As such, 3GPP terminology is oftentimes used herein. As such, the cellular communication network 10 is sometimes referred to herein as a LTE cellular communication network 10. However, while the embodiments described herein focus on 3GPP LTE, the embodiments and concepts disclosed herein may be used in any suitable type of cellular communications network (e.g., WiMAX). Further, in an LTE network, VoIP is sometimes referred to as Voice over LTE (VoLTE).

The LTE cellular communication network 10 includes an LTE core network 12 and an LTE Radio Access Network (RAN) 14. As illustrated, in this example, the LTE core network 12 includes a content provider 16, a Broadcast Multicast Service Center (BM-SC) 18, an MBMS gateway 20, and a Mobility Management Entity (MME) 22. The content provider 16 is the source of one or more data or multimedia files, which are provided to the LTE RAN 14 via the BM-SC 18 and the MBMS gateway 20. The MME 22 acts as the key control-node for the LTE cellular communication network 10, managing such functions as wireless device tracking and paging including retransmissions, bearer activation/deactivation, user authentication, and the like.

The LTE RAN 14 includes an MBMS Coordination Entity (MCE) 24 and the one or more base stations 26. The MCE 24 is a logical node responsible for allocating radio resources, performing session admission control, and otherwise managing MBMS services for the LTE RAN 14. While the MCE 24 is shown as a separate entity in FIG. 2, in some embodiments, the MCE 24 may be included as part of the MME 22 or part of a base station 26. Each one of the base stations 26 is an evolved (or enhanced) Node B (eNB) responsible for wirelessly transmitting data to and wirelessly receiving data from a User Equipment devices (UEs) (e.g., the UE 28) in the LTE cellular communication network 10. While only one UE 28 is shown in FIG. 2, the system is not limited thereto. Further, in this embodiment, the base stations 26 are part of an MBMS Single Frequency Network (MBSFN) 30, such that each one of the base stations 26 is configured to transmit an identical waveform during an MBMS data transmission. Note that while the base stations 26 are eNBs in this embodiment, one or both of the base stations 26 may alternatively be low power or small base stations (e.g., pico, micro, or home eNBs) in a heterogeneous deployment. Also, while in this example the MBSFN 30 includes two base stations 26, the MBSFN 30 may include any number of base stations 26, but preferably includes two or more base stations 26.

The content provider 16 is connected to the BM-SC 18 via a user plane connection. The BM-SC 18 is connected to the MBMS gateway 20 via both a user plane and a control plane connection. The MBMS gateway 20 is connected to the MME 22 via a control plane connection. The MBMS gateway 20 is also connected to the one or more eNBs 26 via user plane connection. The MME 22 is connected to the MCE 24 via a control plane connection. Finally, the MCE 24 is connected to the one or more base stations 26 via a control plane connection. While the MCE 24 is shown as a separate element in FIG. 2, the MCE 24 could also be incorporated into one or more of the eNBs 26 or any other suitable network node.

Figure 3:
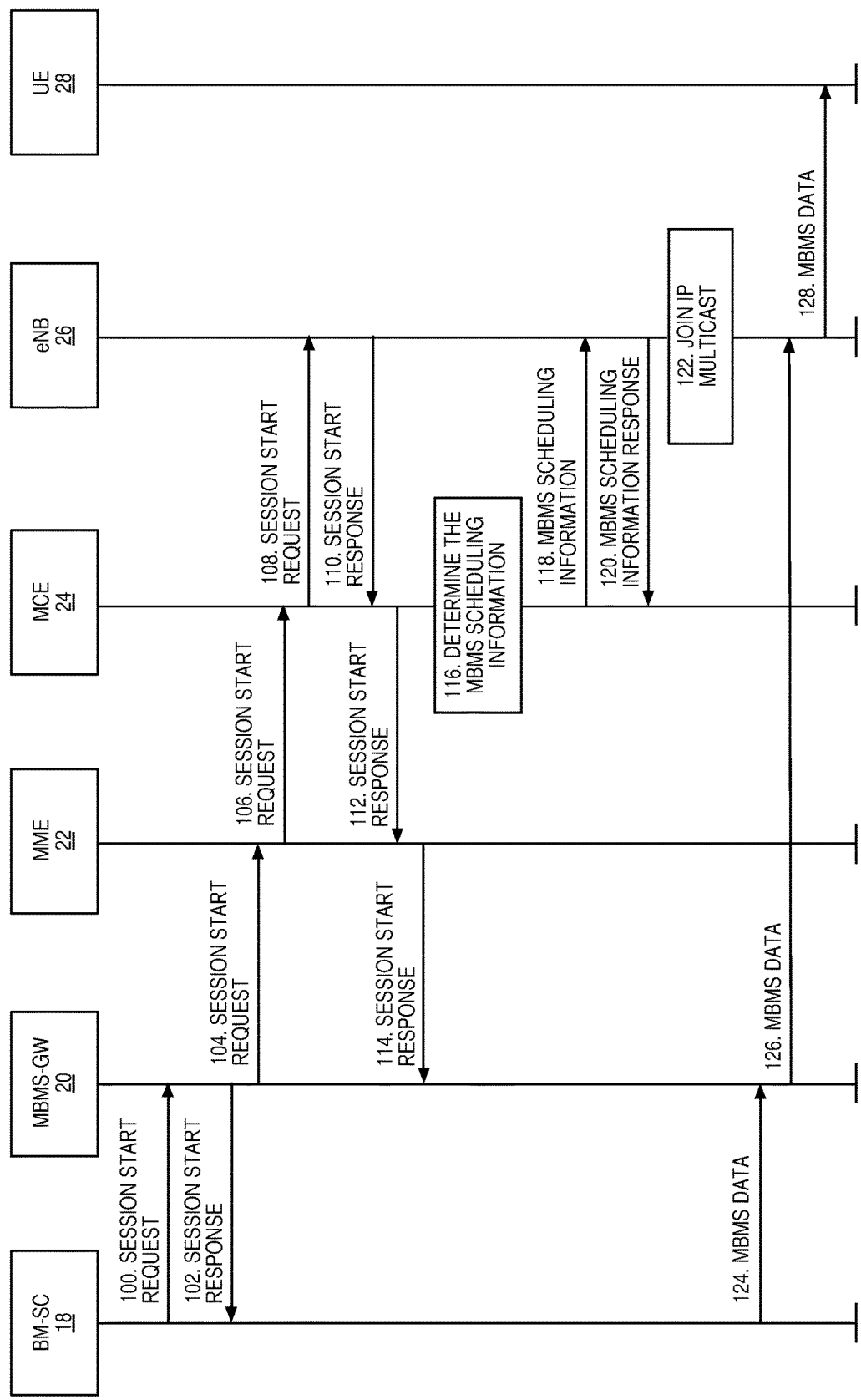
FIG. 3 illustrates the operation of the cellular communication network of FIG. 2 to provide MBMS services according to one embodiment of the present disclosure.

FIG. 3 illustrates the operation of the cellular communication network 10 of FIG. 2 to provide MBMS services according to one embodiment of the present disclosure. When there is multimedia that should be broadcast or multicast, the BM-SC 18 sends an MBMS session start request to the MBMS gateway 20 (step 100). The MBMS gateway 20 replies to the BM-SC 18 with an MBMS session start response (step 102) indicating that the MBMS session start request has been received. The MBMS gateway 20 then sends an MBMS session start request to MME 22 (step 104). The MME 22 sends an MBMS session start request to MCE 24 (step 106). The MCE 24 then sends an MBMS session start request to the eNBs 26 (step 108). The eNBs 26 reply to the MCE 24 with an MBMS session start response (step 110) indicating that the MBMS session start request has been received. The MCE 24 replies to the MME 22 with an MBMS session start response (step 112) indicating that the MBMS session start request has been received, and MME 22 replies to the MBMS gateway 20 with an MBMS session start response (step 114) indicating that the MBMS session start request has been received. The MCE 24 then determines MBMS scheduling information (step 116).

The scheduling information includes the specific frame numbers and subframe numbers that will be reserved for MBMS subframes to be transmitted. In 3GPP LTE, MBMS subframes can be configured on any subframes within a radio frame except on subframes 0, 4, 5, and 9 for Frequency Division Duplex (FDD) systems or subframes 0, 1, 2, 5, and 6 for Time Division Duplex (TDD) systems. Although the system is not required to transmit MBMS data on the configured, or allocated, MBMS subframes, the UE 28 will not be able to receive any other data during those subframes. This MBMS scheduling information may be determined based on an MBMS load value that determines the percentage of subframes which should be reserved for MBMS. Currently, in 3GPP LTE, the MBMS load value is limited to 60% (or less). However, the present disclosure is not limited thereto. The scheduling information may also include or be determined based on an MBMS allocation period which is the period of frames which will be used for MBMS. The number of MBMS subframes needed in the MBMS allocation period can be calculated by multiplying the MBMS load value by the MBMS allocation period. The MBMS load value may be determined based on the radio bandwidth required to support MBMS services with acceptable service quality. The MCE 24 may determine the MBMS load value and/or the MBMS allocation period, or the MCE 24 may receive one or both from the MME 22, the MBMS gateway 20, or any other suitable network node.

Once the MCE 24 determines the MBMS scheduling information, the MCE 24 sends the MBMS scheduling information to the one or more eNBs 26 (step 118). The eNB 26 replies to the MCE 24 with an MBMS scheduling information response (step 120) indicating that the MBMS scheduling information has been received.

At this point, the eNB 26 joins an internet protocol (IP) multicast provided by the MBMS service (step 122). Without regard to whether the UE 28 joins an IP multicast, the BM-SC 18 may begin transmitting MBMS data to the MBMS gateway 20 (step 124) which may begin transmitting one or more IP multicasts containing the MBMS data to the eNB 26 using the MBMS services (step 126). The content provider 16 (not shown) or any other suitable network node is the source of one or more data or multimedia files that serves as the content for the multicast. The eNB 26 will then transmit the one or more multicasts containing the MBMS data to the UE 28 (step 128). Again, the IP multicast transmissions will occur without regard to whether any UE 28 wishes to receive the IP multicasts. If the UE 28 does wish to receive the IP multicast, the UE 28 will receive and decode the data sent during the MBMS subframes according to the MBMS scheduling information. If the UE 28 does not wish to receive the IP multicast, the UE 28 does not need to receive or decode the data transmitted during the MBMS subframes according to the MBMS scheduling information and may even determine to enter a sleep cycle during these subframes, according to some embodiments. In either case, the UE 28 is unable to receive any other type of data during the MBMS subframes.

If the cellular communication network 10 also implements VoIP, the VoIP Radio Access Bearers (RABs) transmit and receive packets with a specific periodicity. The VoIP periodicity is typically to transmit and receive packets every 20 ms during a talk spurt. In other implementations, the VoIP RABs transmit every 40 ms during a talk spurt when two packets are bundled together.

To conserve the battery power of the UE 28 when transmitting/receiving VoIP packets, the UE 28 may operate with Discontinuous Reception (DRX) enabled. Typically, the DRX period is set to the same periodicity as the VoIP RAB, with the DRX ON TIME set to a minimum number of subframes to receive the VoIP packets. These DRX settings allow a UE to receive the VoIP RAB transmissions while conserving power by powering down (or operating at low power) most of the receiving and/or transmitting circuitry, when not receiving VoIP packets.

When some of the subframes are already allocated for MBMS service, VoIP RABs cannot be received during those subframes. If these MBMS scheduled subframes interfere with the scheduled VoIP packet receptions, this may result in the VoIP UEs experiencing degradation in quality due to missed packets. These MBMS allocated subframes may also result in additional battery drain at the UE if the UE must maintain a longer DRX ON TIME in order to receive the VoIP RAB reception. Note that while this embodiment relates to VoIP, similar problems may be encountered by other Guaranteed Bit Rate (GBR) traffic.

Figure 4:
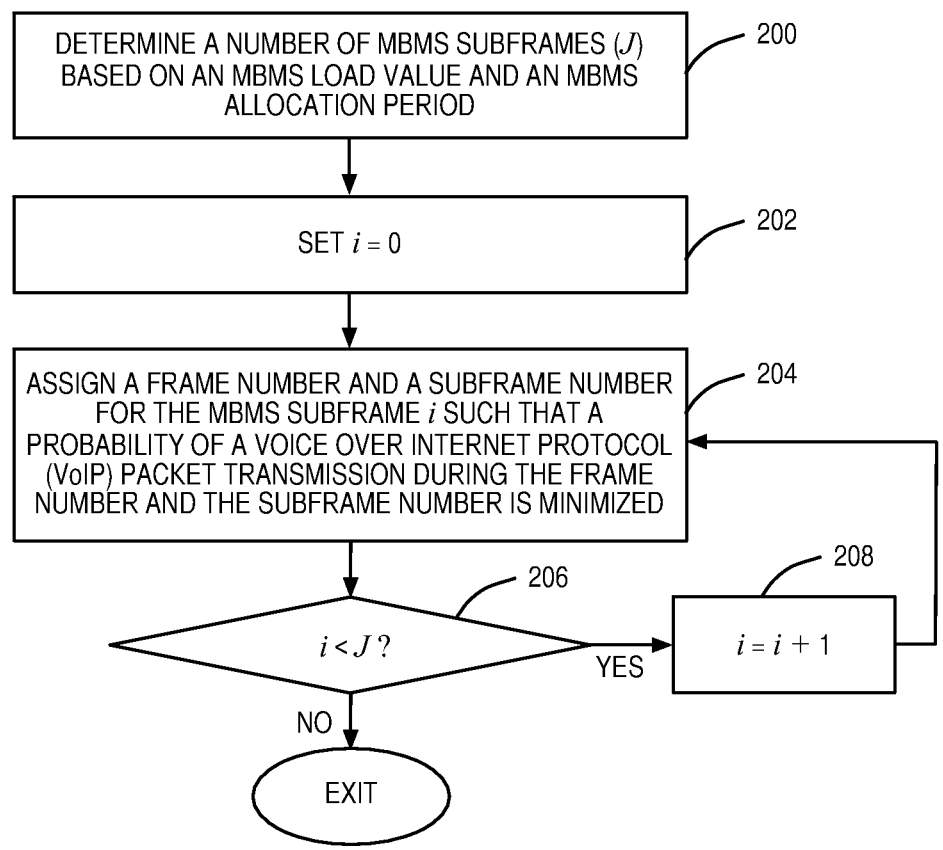
FIG. 4 illustrates the operation of the cellular communication network of FIG. 2 for scheduling MBMS subframes according to one embodiment of the present disclosure.

In order to address these problems, FIG. 4 illustrates the operation of the cellular communication network 10 for scheduling MBMS subframes according to another embodiment of the present disclosure. This process could be carried out by the MCE 24 as part of step 108 in FIG. 3 or by any other suitable network node. First, the network node determines a number of MBMS subframes (J) that are needed, based on an MBMS load value and an MBMS allocation period (step 200). Typically, the MBMS load is determined by the service content and the required QoS. Based on the knowledge of the required modulation and coding scheme needed for transmitting this information over the LTE air-interface, the number of radio resources needed, i.e. J subframes, is computed. The network node then initializes a counter i by setting the counter i to zero (step 202). The network node assigns a frame number and a subframe number for the ith MBMS subframe such that a probability of a VoIP packet transmission during the frame number and the subframe number is minimized (step 204). The frame numbers and subframe numbers for the MBMS subframes may be assigned to minimize the probably of a VoIP packet transmission during the frame and subframe assigned for the MBMS subframe in various ways, some examples of which are described below in detail. The network node then checks whether all J MBMS subframes have been assigned a frame number and a subframe number. This is accomplished in this implementation by testing whether i is still less than J (step 206). If all J MBMS subframes have been assigned a frame number and a subframe number, the process exits. Otherwise, the counter i is incremented by one and the process returns to step 204 (step 208). By mitigating the probability that a VoIP packet transmission occurs during a scheduled MBMS subframe, UE 28 may miss fewer packets and/or experience reduced battery drain.

While this discussion so far has focused on MBMS subframes, this disclosure is not limited thereto. Many special subframes may be scheduled in advance and preclude the reception of other data. For example, but without limitation, the special subframes may also be Almost Blank Subframes (ABS), New Carrier Type (NCT) subframes and subframes assigned for Positioning Reference Signals (PRS).

Figure 5:
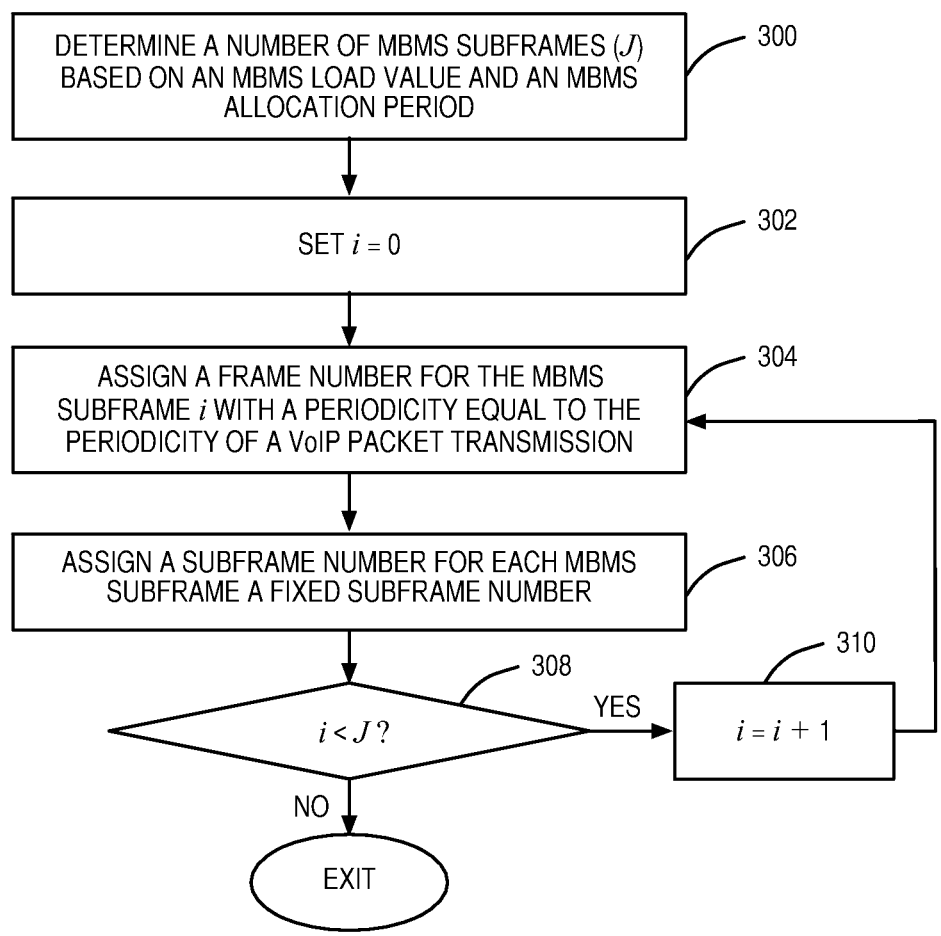
FIG. 5 illustrates the operation of the cellular communication network of FIG. 2 for scheduling MBMS subframes according to one embodiment of the present disclosure.

FIG. 5 illustrates the operation of the cellular communication network 10 for scheduling MBMS subframes according to one embodiment of the present disclosure. This process is similar to the process described in FIG. 4 with additional details provided for step 204. First, the network node determines a number of MBMS subframes (J) that are needed, based on an MBMS load value and an MBMS allocation period (step 300). The network node then initializes a counter i to zero (step 302). The network node assigns a frame number for the ith MBMS subframe with a periodicity equal to the periodicity of a VoIP packet transmission (step 304). The network node assigns a subframe number for each MBMS subframe a fixed subframe number (step 306). The network node then checks whether all J MBMS subframes have been assigned a frame number and a subframe number. This is accomplished in this implementation by testing whether i is still less than J (step 308). If all J MBMS subframes have been assigned a frame number and a subframe number, the process exits. Otherwise, the counter i is incremented by one and the process returns to step 304 (step 310).

Figure 6:
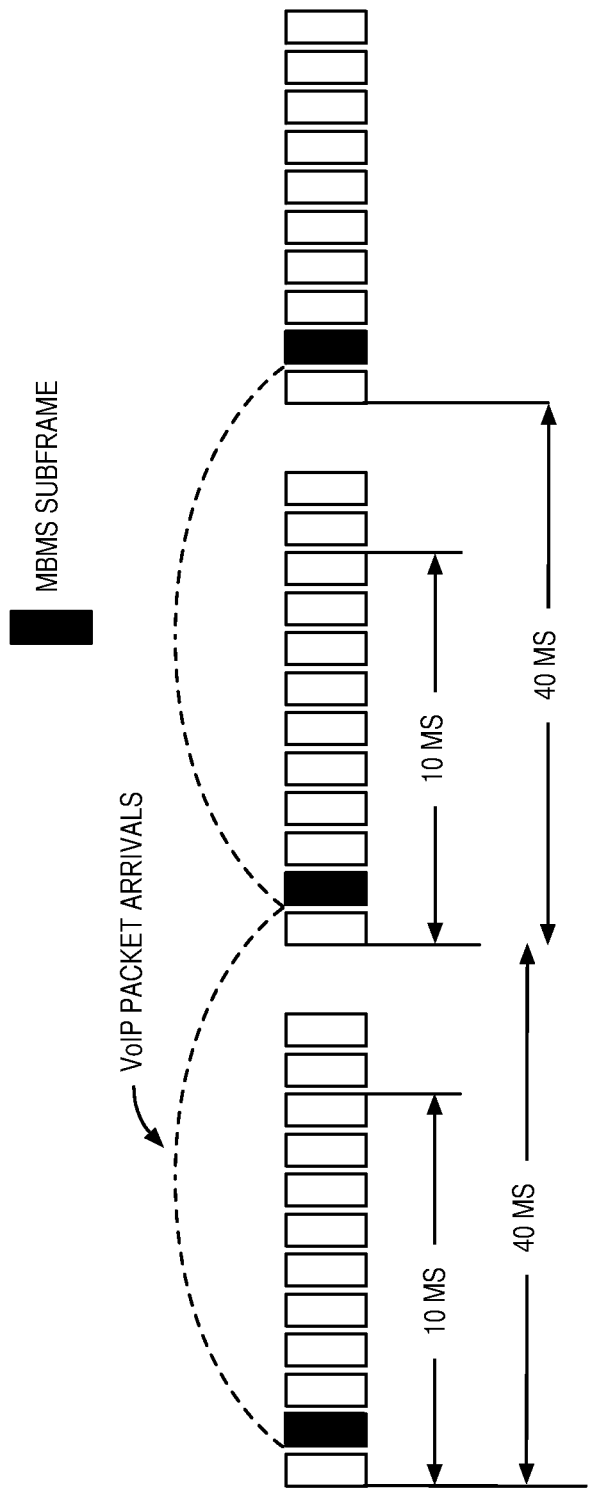
FIG. 6 is a diagram depicting an example of scheduled MBMS subframes as a result of the process of FIG. 5 according to one embodiment.

The process of FIG. 5 will schedule the MBMS subframes with the most distance between adjacent MBMS subframes and match the periodicity of the VoIP RAB. The distance between the MBMS subframes will be equal to the periodicity of the VoIP RAB. This means that all of the MBMS subframes will collide with one of the VoIP RAB offsets since the MBMS subframes are scheduled with the same periodicity. For every other VoIP RAB offset, there will be no collisions with any of the MBMS subframes. This scheduling is illustrated by FIG. 6, which is a diagram depicting an example of scheduled MBMS subframes as a result of the process of FIG. 5 according to one embodiment. In this example, the VoIP RAB periodicity is every 40 milliseconds (ms). Each subframe is 1 ms and each frame includes 10 subframes (10 ms). Three MBMS subframes are shown as being scheduled. Since the VoIP RAB periodicity is every 40 subframes, the MBMS subframes are assigned to frames that are every four frames. Each of the three MBMS subframes in FIG. 6 are assigned the same fixed subframe of 1. In this example and in most systems, the subframes are numbered from 0 through 9. As previously discussed, in LTE MBMS subframes are not permitted to be scheduled in subframe 0, so subframe 1 is the first subframe available for FDD. The following examples assume an FDD system unless otherwise noted, but this disclosure is not limited thereto. As shown in FIG. 6, these MBMS subframes are separated by 39 subframes. A VoIP RAB with an offset of any of those other 39 subframes would not collide with any of these MBMS subframes.

Figure 7:
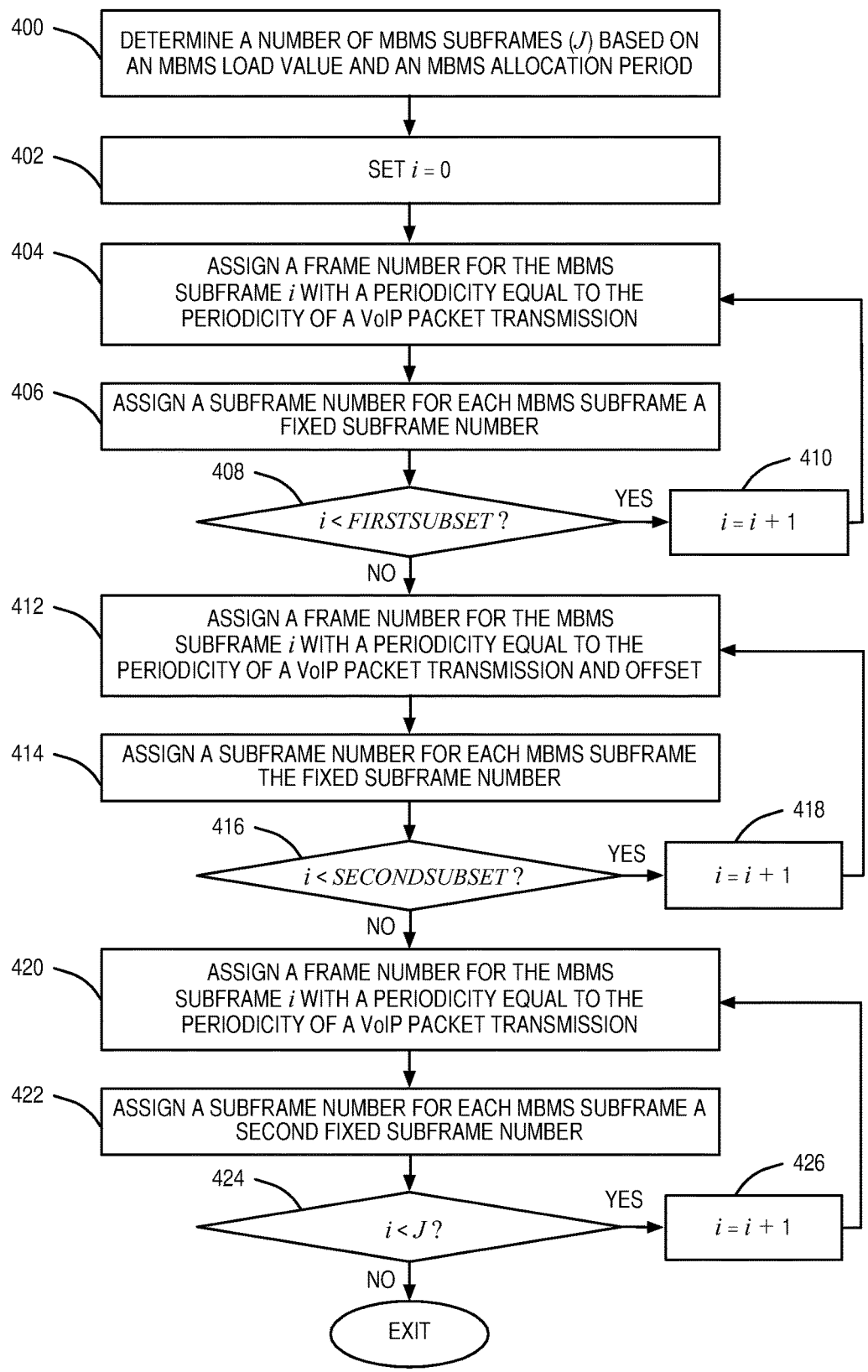
FIG. 7 illustrates the operation of the cellular communication network of FIG. 2 for scheduling MBMS subframes according to another embodiment of the present disclosure.

The method of FIG. 5 provides the largest separation possible between scheduled MBMS subframes with a periodicity equal to the periodicity of the VoIP RAB, but this method only selects one MBMS subframe per VoIP RAB period. For example, this will provide a maximum MBMS load value of 2.5% for a periodicity of 40 subframes (1/40) and a maximum MBMS load value of 5% for a periodicity of 20 subframes (1/20). Since these MBMS load values are both far below the maximum allowable MBMS load value of 60%, there may be a need to schedule additional MBMS subframes. As such, FIG. 7 illustrates the operation of a network node (e.g., the MCE 24) of the cellular communication network 10 to schedule MBMS subframes according to another embodiment of the present disclosure. In this embodiment, the MBMS subframes are broken into three subsets. The first subset is scheduled according to the same rules as discussed in relation to FIGS. 5 and 6. If additional MBMS subframes are needed, the second subset of MBMS subframes is scheduled in additional frames. Additional MBMS subframes may also be scheduled by scheduling the third subset of MBMS subframes in frames that already contain MBMS subframes.

First, the network node determines a number of MBMS subframes (J) that are needed, based on an MBMS load value and an MBMS allocation period (step 400). The network node then initializes a counter i to zero (step 402). The network node assigns a frame number for the ith MBMS subframe with a periodicity equal to the periodicity of a VoIP packet transmission (step 404). For example, the frame number assigned to the first MBMS subframe may be the frame number of the first frame in the MBMS allocation period. If the VoIP packet transmission has a period of four radio frames (40 ms), then the remainder of the MBMS subframes will be assigned a frame number equal to the previous frame number plus four frames. The network node assigns a subframe number for an MBMS subframe as a fixed subframe number (step 406). The fixed subframe number can be any subframe number permitted to have MBMS subframes. In one example, the fixed subframe number is subframe number 1 (the second subframe since the index starts at 0). The network node then checks whether all MBMS subframes from the first subset have been assigned a frame number and a subframe number. This is accomplished in this implementation by testing whether i is still less than FIRSTSUBSET (step 408). In one embodiment, FIRSTSUBSET is the maximum number of subframes that can be scheduled in the MBMS allocation period at the periodicity of the VoIP packet transmission. For example, if the MBMS allocation period is 1 minute and the VoIP periodicity is 40 ms, then FIRSTSUBSET=1 minute/ 40 ms=1500. If all MBMS subframes from the first subset have been assigned a frame number and a subframe number, the process continues on to the second subset. Otherwise, the counter i is incremented by one and the process returns to step 404 (step 410).

This example assumes that J is large enough to require scheduling from each of the three subsets of MBMS subframes described. In actual operation, the method may include a check for the number of subsets needed or a check after each subset to determine if more MBMS subframes need to be schedule and therefore require the processing of another subset. For the second subset of MBMS subframes, the network node then assigns a frame number for the ith MBMS subframe with a periodicity equal to the periodicity of a VoIP packet transmission and offset from the frame numbers used during the first subset (step 412). For example, the frame number assigned to the first MBMS subframe of the second subset may be the frame number of the first frame in the MBMS allocation period plus an offset. This offset is greater than zero and less than the period of the VoIP packet transmission. If the VoIP packet transmission has a period of four radio frames (40 ms), then the offset may be one, two, or three radio frames. The remainder of the MBMS subframes in the second subset will be assigned a frame number equal to the previous frame number plus four (the period of the VoIP packet transmission). For instance, the offset might be accomplished by adding one or two frames to the frames as assigned previously, depending on implementation. In a preferred embodiment, the offset is equal to half of the VoIP RAB periodicity. The network node assigns a subframe number for each MBMS subframe the fixed subframe number (step 414). This is the same fixed subframe number as used in step 406. In this embodiment, the fixed subframe number for the second subset of MBMS subframes is the same fixed subframe number as used for the first subset of MBMS subframes. However, the present disclosure is not limited thereto. As before, using the same fixed subframe number for the second subset of MBMS subframes provides the largest possible separation for the MBMS subframes with a periodicity equal to the periodicity of the VoIP RAB. This provides the largest possible number of VoIP offsets that should not collide with any MBMS subframes. The network node then checks whether all MBMS subframes from the second subset have been assigned a frame number and a subframe number. This is accomplished in this implementation by testing whether i is still less than SECONDSUBSET (step 416). In one embodiment, SECONDSUBSET is the maximum number of subframes that can be scheduled in the MBMS allocation period at the periodicity of the VoIP packet transmission with two per VoIP period. For example, if the MBMS allocation period is 1 minute and the VoIP periodicity is 40 ms, then SECONDSUBSET=2*1 minute/40 ms=3000. If all MBMS subframes from the second subset have been assigned a frame number and a subframe number, the process continues on to the third and final subset for this embodiment. Otherwise, the counter i is incremented by one and the process returns to step 412 (step 418). Similar procedure can be devised when the VoIP period is more than the MBSFN periodicity. For example, when 4 VoIP packets are bundled and transmitted every 80 ms, the above outlined procedure can be performed for an MBSFN periodicity of 80 ms. At the end of the procedure, if the MBSFN pattern is restricted to be 40 ms, the MBSFN pattern for 40 ms is defined as the first half or the second half of the 80 ms pattern, whichever has the most MBSFN subframes. In general, the above mentioned procedure can be applied to any periodicity of VoIP packets. The MBSFN pattern can be determined for a periodicity of S=LCM (VoIP periodicity, MBSFN periodicity, i.e. 40 ms), where LCM is the least common multiple. If the MBSFN pattern periodicity, S1, is restricted to be less than S, then the pattern within a consecutive S1 subframes within the pattern of S subframes which has the most MBSFN subframes is selected.

For the third subset of MBMS subframes, the network node then assigns a frame number for the ith MBMS subframe with a periodicity equal to the periodicity of a VoIP packet transmission (step 420). These frame numbers include the frames used for the first subset of MBMS subframes and the frames used for the second subset of MBMS subframes. The network node assigns a subframe number for each MBMS subframe a second fixed subframe number (step 422). In this embodiment, the second fixed subframe number is different than the fixed subframe number used for the first and second subsets of MBMS subframes. In a preferred embodiment, if the fixed subframe number for the first two subsets was subframe 1, then the second fixed subframe number used for the third subset is subframe 6. As before, this may provide the largest possible separation for the MBMS subframes with a periodicity equal to the periodicity of the VoIP RAB. The network node then checks whether all MBMS subframes from the third subset have been assigned a frame number and a subframe number. This is accomplished in this implementation by testing whether i is still less than J (step 424). If all MBMS subframes have been assigned a frame number and a subframe number, the process exits. Otherwise, the counter i is incremented by one and the process returns to step 420 (step 426).

While three subsets are described in relation to FIG. 7, the present disclosure is not limited thereto. Although the method does not restrict which fixed subframe number to choose, by choosing the next fixed subframe number as separated from the previous fixed subframe numbers as possible, the distance between all of the scheduled MBMS subframes will be maximized. One example order for FDD is {1, 6, 3, 8, 2, 7} and for TDD is {3, 8, 9, 4, 7}. FIGS. 8A through 8C are diagrams depicting an example of scheduled MBMS subframes as a result of a process similar to the process of FIG. 7 according to one embodiment of the present disclosure. FIGS. 8A though 8C show an embodiment for FDD where the VoIP RAB periodicity is 20 subframes (2 frames). More specifically, FIG. 8A illustrates the first subset of MBMS subframes selected according to one example of steps 400-410 of FIG. 7 and is similar to the diagram in FIG. 6. FIG. 8A shows two MBMS subframes scheduled with a periodicity equal to the periodicity of the VoIP RAB (20 subframes). This corresponds to MBMS subframes with 19 subframes between each MBMS subframe.

FIG. 8B illustrates the second subset of MBMS subframes in addition to the first subset of MBMS subframes. The second subset of MBMS subframes are selected according to one example embodiment of steps 412-418 of FIG. 7. FIG. 8B shows the same two MBMS subframes from FIG. 8A and an additional two MBMS subframes scheduled with a periodicity equal to the periodicity of the VoIP RAB (20 subframes) and offset from the frame numbers used during the first subset. In this example, the offset is half of the VoIP RAB period, which is 1 frame (10 subframes). As such, FIG. 8B shows four MBMS subframes, all in different frames but all sharing the same fixed subframe number. This corresponds to MBMS subframes with 9 subframes between each MBMS subframe.

FIG. 8C illustrates the third subset of MBMS subframes selected according to one example embodiment of steps 420-426 of FIG. 7. FIG. 8C shows the same four MBMS subframes from FIG. 8B and an additional four MBMS subframes scheduled with a second fixed subframe number.

In this embodiment, the frame numbers are the same as those used in FIG. 8B, which include the frames used for the first subset of MBMS subframes and the frames used for the second subset of MBMS subframes, and the second fixed subframe number is 5. As such, FIG. 8C shows eight MBMS subframes. This corresponds to MBMS subframes with 4 subframes between the MBMS subframes. Although only three subsets are shown in this example, this process can be continued with additional subframe numbers until all J MBMS subframes needed are scheduled.

In one embodiment, MBMS subframes are assigned such that the time between the adjacent MBMS subframes is maximized. If the MBMS allocation period is P (expressed in radio frames), the MBMS subframes are allocated in the radio frame i+4k for all k such that i+4k<i+P. If the required number of subframes are more, then subframes in radio frames i+4k+2 for all k such that i+4k+2<1+P are allocated.

In general, the ith MBMS subframe is allocated in the mth radio frame as follows:

$$m = \mod\left(\sum_{k=0}^{P_2} \left\lfloor \frac{i}{2^k} \right\rfloor \left\lfloor \frac{P}{2^{k+1}} \right\rfloor, P\right)$$

where $P_2 = \log_2 P$. For example if J MBMS subframes are to be allocated in P radio frames, the above equation is evaluated for i=0, 1, ..., J-1. The radio frame, subframe pair is given as (m, l) where l=x(u);

$$u = \left\lfloor \frac{i}{P} \right\rfloor$$

and x={1, 6, 3, 8, 2, 7}. Here [a] represents (the floor function) the largest integer not greater than a.

The above general formulation distributes the MBMS subframes across the allocation period such that the VoIP capacity is maximized by creating more VoIP RAB offsets that should not collide with any MBMS subframes. This reduces the packet delay or jitter of the VoIP RABs. This can also reduce the power use of the UE 28 because the UE 28 may be able to use a lower value for the DRX ON TIME parameter since there is a decreased probability of a VoIP RAB transmission colliding with an MBMS subframe.

These optimized MBMS subframe patterns can be generated based on the expected MBMS load in terms of the percentage of the total available bandwidth. The required bandwidth can be converted into number of subframes once the MBMS radio frame periodicity, P is determined.

In LTE, the MBMS subframe patterns generated as described earlier are mapped to one or more 24 bit patterns (4 subframes with 6 bits per subframe) to include with the Radio Resource Control (RRC) message description fields. FIGS. 9A and 9B are information elements (IEs) to communicate MBMS scheduling information such as MBMS subframe patterns according to one embodiment of the present disclosure. FIG. 9A shows the MBSFNSubframe-Config IE and FIG. 9B shows the MBSFNAreaConfiguration IE. The fields in the MBSFNSubframeConfig IE and MBSFNAreaConfiguration IE message are adjusted to match the generated patterns as closely as possible. In some embodiments, these IEs are included in the MBMS scheduling information sent in steps 110 and 112 in FIG. 3.

As previously stated, by designing the MBMS subframe pattern appropriately, the arrival of VoIP packets during the MBMS subframes can be minimized. However, congestion at the radio resource scheduler may force the VoIP user to wait for the future frames, if the DRX parameters for the VoIP RABs are not optimized. For instance, if the congestion prevents the VoIP RABs from being transmitted during the scheduled frame, the VoIP packet may be transmitted in a subsequent frame. If the DRX offset values for the VoIP RABs are overloaded or are in close proximity to MBMS subframes, the subsequent transmission may come several subframes later. If the DRX ON TIME (or DRX On Duration) for the VoIP RABs is not set high enough, then the transmission may be missed entirely and the UE 28 may experience this as packet delay/jitter.

In one embodiment, once the MBMS subframe pattern is determined for the system, whether by the previous methods or any other method, the DRX parameters for the incoming VoIP RABs may be determined to maximize the system capacity and quality of service. For example, DRX parameters for the incoming VoIP RABs can be optimized to minimize the packet jitter or delay and extend battery life by selecting the appropriate values for the DRX offset and DRX ON TIME respectively. For instance, the DRX offset can be set such that the probability of the user getting the required resources in that assigned subframe is maximized.

This procedure may make sure that the wake up time of the UE 28 does not align (collide) with any of the MBMS allocated subframes. The DRX ON TIME of the UE 28 may be adjusted to the optimum period to extend the battery life of UE 28 without quality degradation due to VOIP packet loss. Note that the DRX ON TIME of the VoIP RAB may be adjusted based on the relative position of the subframe assigned to the VoIP packet relative to the MBMS subframes in the vicinity. For example, if the subframe immediately following the VoIP packet is assigned as an MBMS subframe, the DRX ON TIME parameter is increased such that the VoIP RAB has a chance to transmit the VoIP packet in a future instant in case of scarcity of radio resources.

Figure 10:
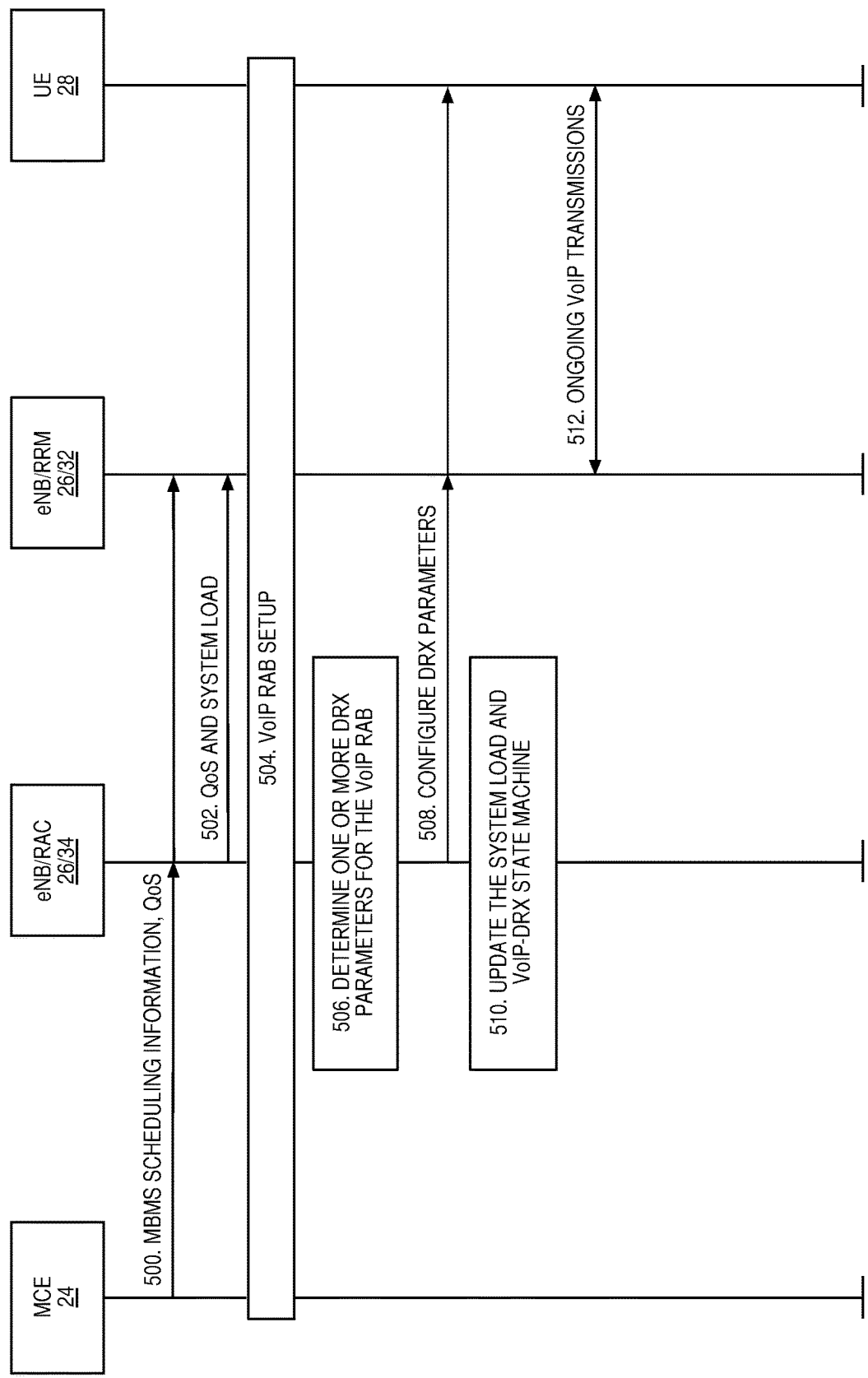
FIG. 10 illustrates the operation of the cellular communication network of FIG. 2 for receiving a Voice over Internet Protocol (VoIP) Radio Access Bearer (RAB) request and configuring discontinuous reception (DRX) parameters according to one embodiment of the present disclosure.

In this regard, FIG. 10 illustrates the operation of the cellular communication network 10 for receiving a VoIP RAB request and configuring DRX parameters according to one embodiment of the present disclosure. FIG. 10 includes a Radio Resource Management entity (RRM) 32 that exists within a eNB 26 and is responsible for scheduling the radio resource for communication with a UE 28. While the RRM 32 is illustrated as a separate entity in FIG. 10, the functions performed by the RRM 32 may be performed by the eNB 26, for example. FIG. 10 also includes a Radio Access Control (RAC) 34 subsystem that may be implemented as a separate entity or may be included as part of eNB 26. The RAC 34 approves or denies requests for new RABs and determines appropriate parameters for the RABs. Some of the many functions of the RAC 34 are the establishment, configuration, maintenance, and release of RABs, and Quality of Service (QoS) management functions.

In FIG. 10, an MCE 24 sends MBMS scheduling information to the eNB 26/RRM 32 (step 500) via eNB 26/RAC 34. This MBMS scheduling information may have been determined using, for example, one of the MBMS subframe scheduling processes described above or any other MBMS subframe scheduling scheme. Furthermore, while these examples discuss the use of MBMS scheduling information, the present disclosure is not limited thereto. The MBMS scheduling information can instead be any special subframe scheduling information as discussed above (e.g., scheduling information for Almost Blank Subframes (ABSs)). The RRM 32 also obtains QoS and system load information from the RAC 34 (step 502). Next, the RAC 34 receives a VoIP RAB setup request from the core network (step 504). The RAC 34 determines one or more DRX parameters for the VoIP RAB based on the MBMS scheduling information (step 506). The RAC 34 configures DRX parameters for the incoming VoIP RAB and sends these parameter values to both the RRM 32 and the UE 28 (step 508). The RAC 34 then updates the system load and the VoIP-DRX state machine (step 510). Finally, the UE 28 and the eNB 26 can carry on ongoing VoIP transmissions (step 512).

Figure 11:
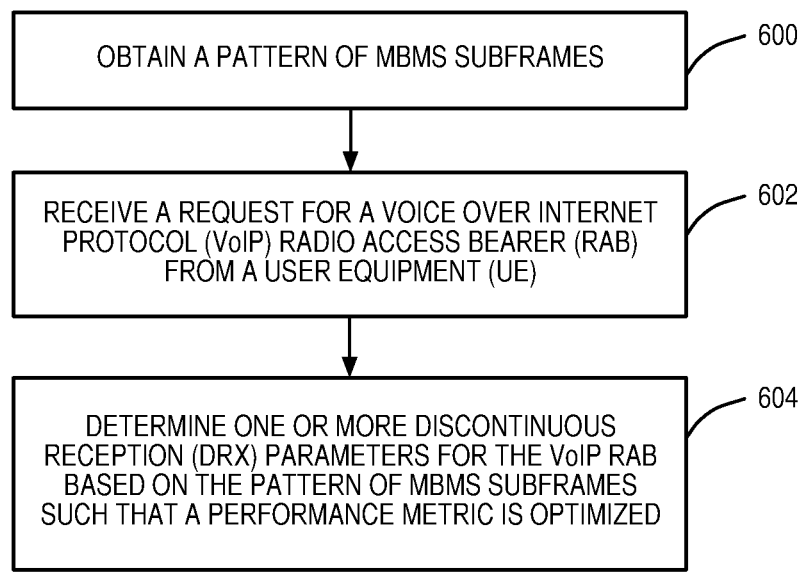
FIG. 11 illustrates the operation of the cellular communication network of FIG. 2 for receiving a VoIP RAB request and configuring DRX parameters based on a pattern of MBMS subframes according to one embodiment of the present disclosure.

FIG. 11 illustrates the operation of the cellular communication network 10 for receiving a VoIP RAB request and configuring DRX parameters based on a pattern of MBMS subframes according to one embodiment of the present disclosure. According to the embodiment described in FIG. 10, this method is performed by the RAC 34, but the current disclosure is not limited thereto. This method may be performed by any suitable network node. The network node obtains a pattern of MBMS subframes (step 600). As discussed above, these MBMS subframes may not necessarily be used for MBMS services, but these MBMS subframes are reserved for that purpose and the UE 28 may not receive any other data during those MBMS subframes. Next, the network node receives a request for a VoIP RAB from a UE 28 (step 602). The network node determines one or more DRX parameters for the VoIP RAB based on the pattern of MBMS subframes such that a performance metric is optimized (step 604). These DRX parameters may include, but are not limited to, the DRX offset parameter and the DRX ON TIME parameter according to some embodiments. The performance metric to be optimized may include, but is not limited to, reducing the packet delay or jitter of the VoIP RABs or reducing the power use of the UE 28 according to some embodiments.

Figure 12:
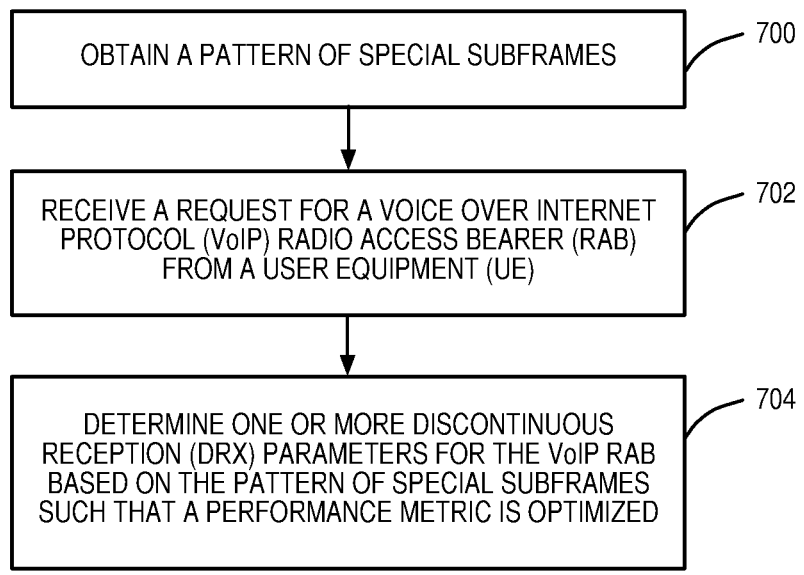
FIG. 12 illustrates the operation of the cellular communication network of FIG. 2 for receiving a VoIP RAB request and configuring DRX parameters based on a pattern of special subframes according to one embodiment of the present disclosure.

As discussed above, while the present disclosure so far has focused on MBMS subframes, this disclosure is not limited thereto. Many special subframes may be scheduled in advance and preclude the reception of other data. For example, but without limitation, the special subframes may also be ABS, NCT subframes and subframes assigned for PRS. In this regard, FIG. 12 illustrates the operation of the cellular communication network 10 for receiving a VoIP RAB request and configuring DRX parameters based on a pattern of special subframes according to one embodiment of the present disclosure. The network node obtains a pattern of special subframes (step 700). Next, the network node receives a request for a VoIP RAB from a UE 28 (step 702). The network node determines one or more DRX parameters for the VoIP RAB based on the pattern of special subframes such that a performance metric is optimized (step 704).

Figure 13:
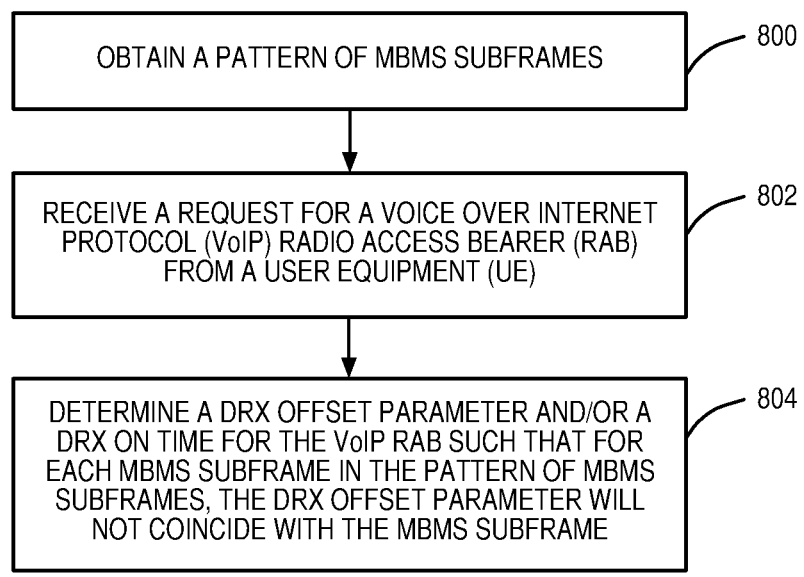
FIG. 13 illustrates the operation of the cellular communication network of FIG. 2 for receiving a VoIP RAB request and configuring a DRX offset parameter and/or a DRX ON TIME parameter based on a pattern of MBMS subframes according to one embodiment of the present disclosure.

FIG. 13 illustrates the operation of a network node (e.g., RAC 34 or eNB 26) of the cellular communication network 10 to receive a VoIP RAB request and configure a DRX offset parameter and/or a DRX ON TIME parameter based on a pattern of MBMS subframes according to one embodiment of the present disclosure. The network node obtains a pattern of MBMS subframes (step 800). Next, the network node receives a request for a VoIP RAB from a UE 28 (step 802). The network node determines a DRX offset parameter and/or a DRX ON TIME for the VoIP RAB such that, for each MBMS subframe in the pattern of MBMS subframes, the DRX offset parameter will not coincide with the MBMS subframe (step 804). By mitigating the probability that a VoIP packet transmission occurs during a scheduled MBMS subframe, a UE 28 may miss fewer packets and/or experience reduced battery drain.

In general, the VoIP RAB will follow the DRX wakeup pattern. The UE 28 wakes up when the subframe number satisfies the following criterion:

$$(SFN*10+n)\% \ T_p = T_{offset}$$

where SFN represents the current radio frame and n represents the current subframe number. $T_p$ represents the DRX period and $T_{offset}$ represents the DRX offset. For improving VoIP performance in the presence of MBMS service on the same carrier as in the method of FIG. 13, the DRX offset, $T_{offset}$ is selected such that the following criterion is satisfied:

$$T_{offset} \neq (10m+l)\% \ T_p$$

for all (m, l), where (m, l) are the radio frame and subframe pairs representing the MBMS subframes. Alternatively, the DRX offset may be chosen so that the probability of colliding with an MBMS subframe is below a threshold, i.e. Probability$\{T_{offset}=(10m+l) \% \ T_p\}$<threshold. This threshold may be determined based on a VoIP packet delay budget for the VoIP RAB.

Determining a value for the DRX offset parameter is important for many reasons already discussed, but the DRX ON TIME parameter determines the amount of time the UE 28 spends out of sleep state when the DRX offset occurs. If the DRX ON TIME parameter is set too high, the UE 28 may use more power than necessary and drain its battery faster. On the other hand, if the DRX ON TIME parameter is set too low, the UE 28 may not stay awake long enough to receive the VoIP packet if there is some delay in the transmission of the VoIP packet. As such, FIG. 14 illustrates the operation of a network node (e.g., RAC 34 or eNB 26) of the cellular communication network 10 to receive a VoIP RAB request and determine a suitable DRX ON TIME parameter for the VoIP RAB according to one embodiment of the present disclosure.

First, the network node obtains a pattern of MBMS subframes (step 900). Next, the network node receives a request for a VoIP RAB from a UE 28 (step 902). The network node then determines if there are any MBMS subframes scheduled to be received immediately after the VoIP RAB is scheduled to be received (step 904). If there are no MBMS subframes scheduled to be received immediately after the VoIP RAB is scheduled to be received, the network node sets the DRX ON TIME parameter for the VoIP RAB to the minimum value for the DRX ON TIME parameter (step 906). This minimum value for the DRX ON TIME parameter is the number of VoIP packets expected to be received. If the VoIP packet is expected to be received within one subframe, the DRX ON TIME parameter will be set to one. If the VoIP packet is expected to be received over two subframes, the DRX ON TIME parameter will be set to two. Otherwise, the network node sets the DRX ON TIME parameter for the VoIP RAB to a value greater than the minimum value for the DRX ON TIME parameter (step 908). For instance, if the VoIP packet is anticipated in one subframe, the DRX ON TIME parameter may be set to three in order for the UE 28 to stay awake during the MBMS subframe and still be awake for one subframe after the MBMS subframe. This attempts to account for the possibility that if the VoIP transmission is delayed, the transmission will not be able to be rescheduled during an MBMS subframe. If an MBMS subframe is scheduled during the period after the VoIP RAB is scheduled to be received, the UE 28 must stay awake long enough to catch a possible retransmission after the one or more MBMS subframes.

Figure 14:
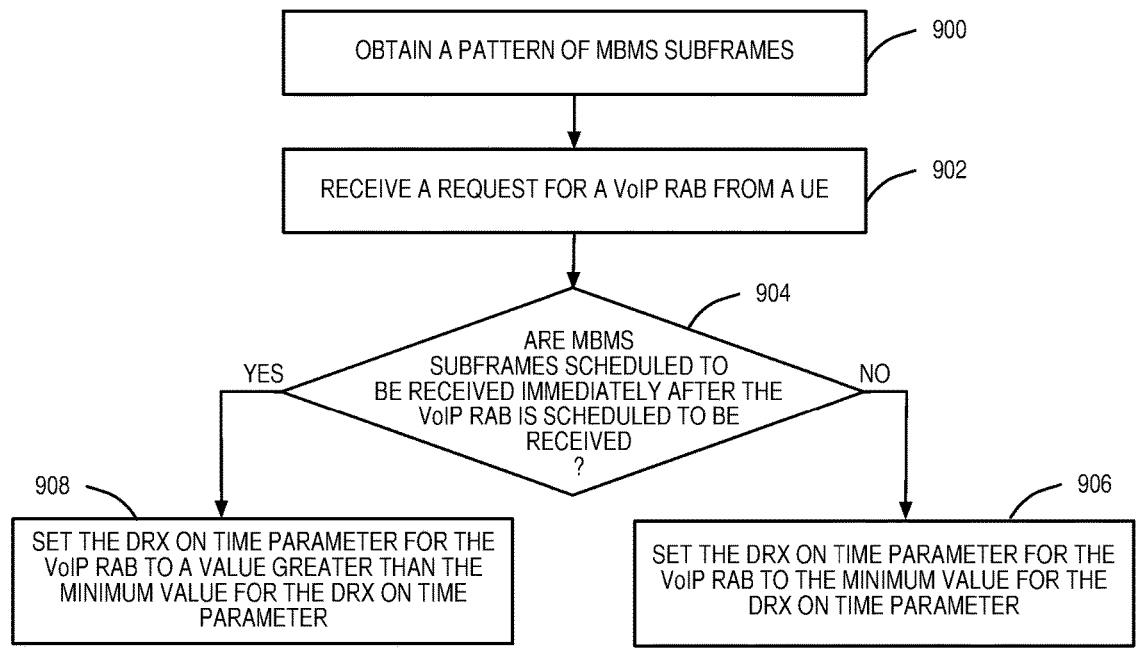
FIG. 14 illustrates the operation of the cellular communication network of FIG. 2 for receiving a VoIP RAB request and determining a suitable DRX ON TIME parameter for the VoIP RAB according to one embodiment of the present disclosure.
Figure 15:
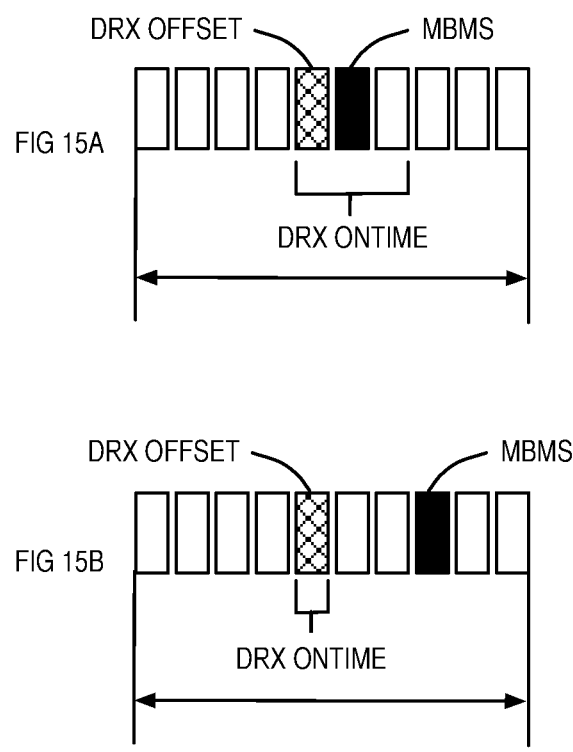
FIGS. 15A and 15B are diagrams depicting examples of DRX ON TIME parameters and scheduled MBMS subframes as a result of the process of FIG. 15 according to one embodiment of the present disclosure.

To illustrate this difference in DRX ON TIME, FIGS. 15A and 15B are diagrams depicting examples of DRX ON TIME parameters and scheduled MBMS subframes as a result of the process of FIG. 14 according to one embodiment of the present disclosure. FIG. 15A shows an example where an MBMS subframe is scheduled immediately after the VoIP RAB is scheduled to be received. In this case, the DRX ON TIME is set to be three subframes in order to be awake for a possible retransmission since the retransmission cannot come during the MBMS subframe. FIG. 15B, on the other hand, shows an example where the MBMS subframe is scheduled three subframes away from the VoIP RAB DRX offset. In this case, according to one embodiment, the DRX ON TIME can be chosen to be shorter because the MBMS subframe placement is not expected to add any delay to any necessary retransmissions. Accordingly, the DRX ON TIME can be set to a lower value and the UE 28 may therefore save more power be being awake for less time. The minimum DRX ON TIME may depend on the expected system load. Since the probability of UE 28 obtaining radio resources during a given subframe is inversely proportional to the system load, the DRX ON time may be increased at higher system loads.

In the preceding paragraphs, procedures for assigning DRX offset and DRX ON TIME parameters for an incoming VoIP RAB for a given MBMS subframe configuration were outlined. However, when assigning the DRX offset to a specific VoIP RAB, other aspects of the suitability of the DRX offset parameter may be considered. For instance, the number of VoIP users already assigned to that DRX offset may be considered such that the new assignment does not cause resource congestion. In one embodiment, one way of avoiding this resource congestion may be to randomly select the DRX offsets every time a new VoIP RAB enters the system. It may be advantageous to also consider the talk spurt statistics to maximize the resource utilization and the VoIP capacity.

Figure 16:
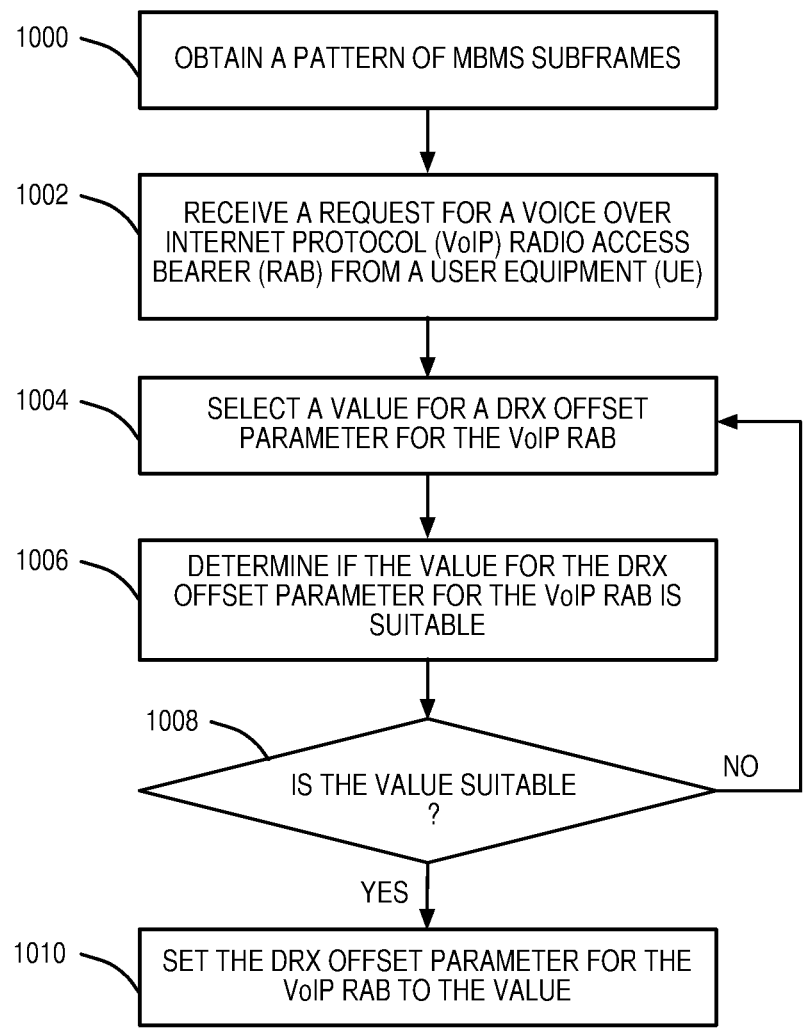
FIG. 16 illustrates the operation of the cellular communication network of FIG. 2 for receiving a VoIP RAB request and determining a suitable DRX offset parameter for the VoIP RAB according to one embodiment of the present disclosure.

In this regard, FIG. 16 illustrates the operation of a network node (e.g., RAC 34 or eNB 26) of the cellular communication network 10 to receive a VoIP RAB request and determine a suitable DRX offset parameter for the VoIP RAB according to one embodiment of the present disclosure. First, a network node obtains a pattern of MBMS subframes (step 1000). As discussed previously, in some embodiments the pattern may be of some other special subframes other than MBMS subframes. Further, in some embodiments, this step is optional and many of the methods in this disclosure can be performed without any pattern of special subframes. The network node then receives a request for a VoIP RAB from a UE 28 (step 1002). The network node selects a value for a DRX offset parameter for the VoIP RAB (step 1004). This selection may take many forms. For instance, in one embodiment, the value selected for the DRX offset parameter is a next value (or for the first iteration a first value) in a sequence of values for the DRX offset parameter. In another embodiment, the value for the DRX offset parameter is randomly selected from a set of possible DRX offset parameter values. In yet another embodiment, the possible values for the DRX parameter are in a sorted list of DRX parameter values, and the value for the DRX offset parameter is the next value in the sort list (or the first value in the sorted list for the first iteration).

The network node then determines if the selected value for the DRX offset parameter for the VoIP RAB is suitable (step 1006). A suitable value for the DRX offset parameter is one that satisfies one or more criteria. For instance, if a DRX offset parameter will cause a VoIP RAB to collide with one or more MBMS subframes, that DRX offset value may not be suitable. Likewise, if assigning the incoming VoIP RAB a DRX offset value will cause a subframe to be periodically overloaded, that DRX offset value may not be suitable. If the value is suitable (step 1008), the network node sets the DRX offset parameter for the VoIP RAB to the selected value (step 1010). If the selected value is not suitable, the method returns to step 1004 and selects another value to evaluate. In this manner, the DRX parameters for an incoming VoIP RAB can be determined based on several possible criteria.

Figure 17:
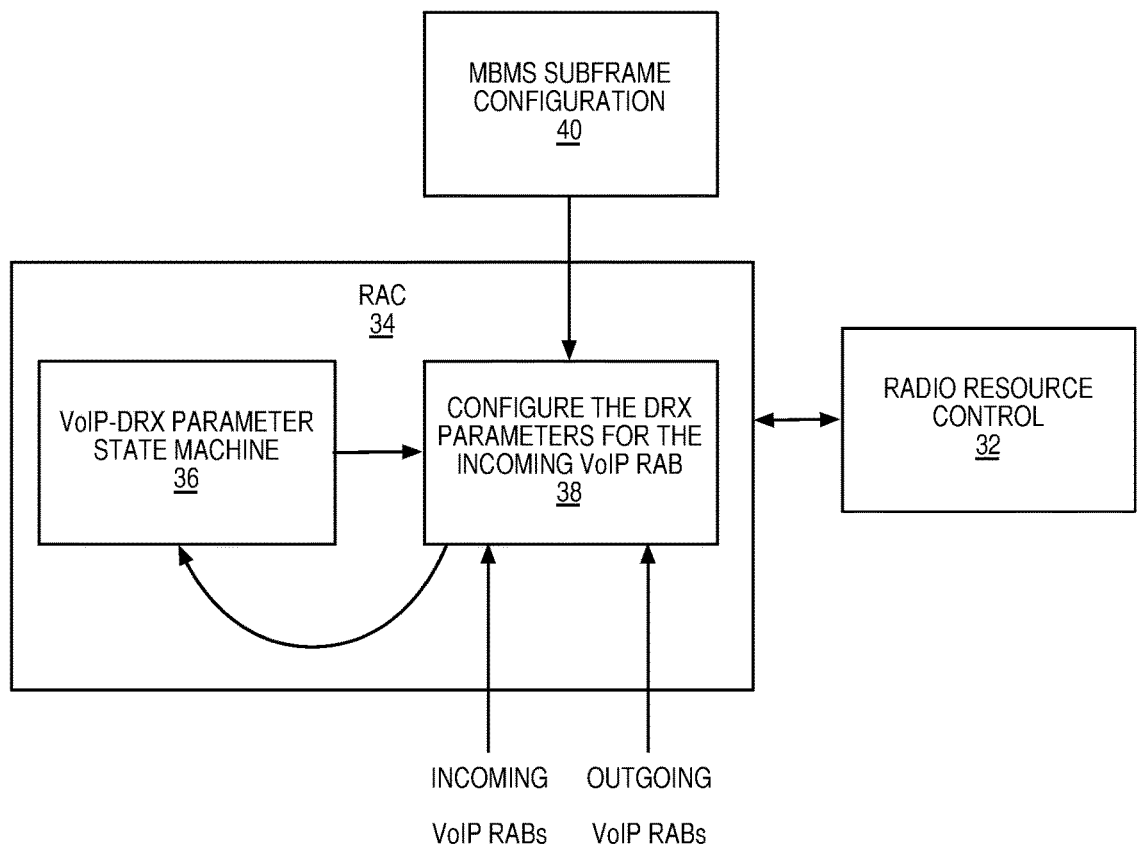
FIG. 17 is a block diagram of a Radio Access Control (RAC) subsystem according to one embodiment of the present disclosure.

One possible way to implement the method of FIG. 16 is shown in FIG. 17. FIG. 17 is a block diagram of a RAC 34 according to one embodiment of the present disclosure. In this embodiment, the RAC 34 includes a VoIP-DRX parameter state machine 36 and a configuration subsystem 38. The RAC 34 receives an MBMS subframe or any special or restrictive subframe configuration 40 as shown in FIG. 17. The RAC 34 receives requests for incoming VoIP RABs and notifications of outgoing VoIP RABs. The RAC 34 is connected to the RRM 32 and able to exchange information in both directions with the RRM 32.

Figure 18:
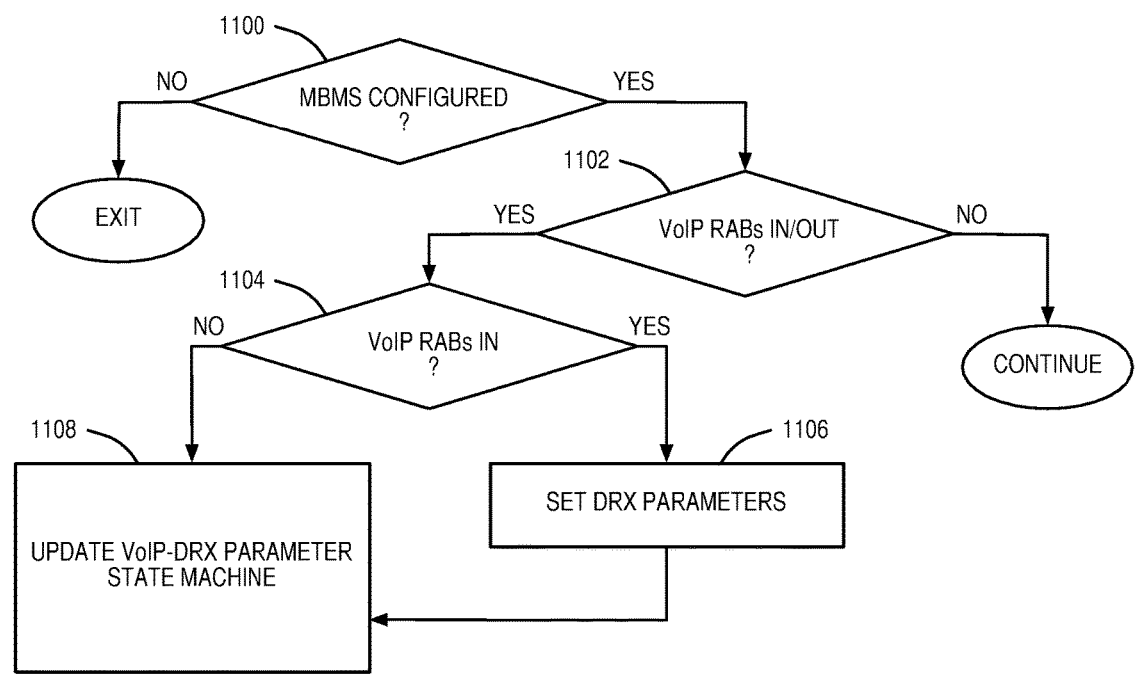
FIG. 18 illustrates the operation of the VoIP-DRX parameter state machine of the RAC of FIG. 17 with MBMS configured according to one embodiment of the present disclosure.

FIG. 18 illustrates the operation of the VoIP-DRX parameter state machine 36 of the RAC 34 of FIG. 17 with MBMS configured according to one embodiment of the present disclosure. The RAC 34 first checks to see if MBMS is configured (step 1100). In this embodiment, if MBMS is not configured, the process exits. If MBMS is configured, the RAC 34 checks if there is a VoIP RAB incoming or outgoing (step 1102). If there is no VoIP RAB incoming or outgoing, the RAC 34 has nothing to do at this time and continues to wait for some change in state. If there is an incoming or outgoing VoIP RAB, the RAC 34 checks if it is an incoming VoIP RAB (step 1104). If it is an incoming VoIP RAB, the RAC 34 sets one or more DRX parameters for the incoming VoIP RAB (step 1106). These DRX parameters may allow the UE 28 associated with the VoIP RAB to save power by not receiving all of the time. The RAC 34 then updates the VoIP-DRX parameter state machine 36 (step 1108). The state variables to be updated may vary depending on implementation. In some embodiments, the state variables keep track of the number of VoIP RABs currently using specific DRX parameters. If the RAC 34 instead receives a notification of an outgoing VoIP RAB, the RAC 34 skips to step 1108 and updates the VoIP-DRX parameter state machine 36.

Figure 19:
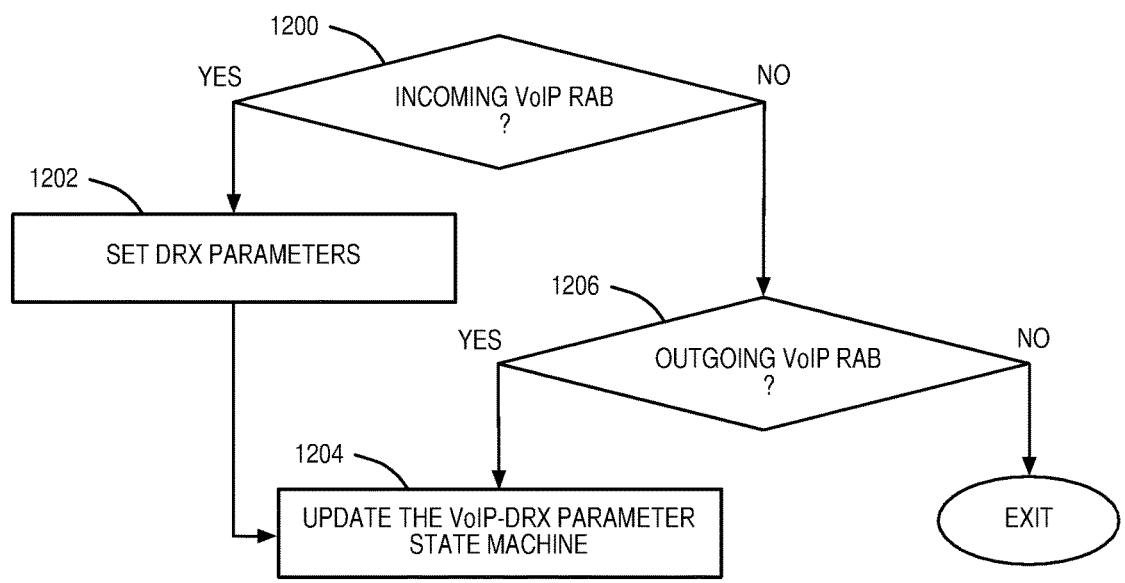
FIG. 19 illustrates the operation of the VoIP-DRX parameter state machine of the RAC of FIG. 17 according to another embodiment of the present disclosure.

To emphasize that the RAC 34 does not need MBMS subframe configuration information in order to operate, FIG. 19 illustrates the operation of the VoIP-DRX parameter state machine of the RAC of FIG. 17 according to another embodiment of the present disclosure. First the RAC 34 checks if there is an incoming VoIP RAB (step 1200). If there is an incoming VoIP RAB, the RAC 34 sets one or more DRX parameters for the incoming VoIP RAB (step 1202). Step 1202 may be similar to or the same as step 1106. The RAC 34 then updates the VoIP-DRX parameter state machine 36 (step 1204). As with the previous embodiment, the state variables to be updated may vary depending on implementation. In some embodiments, the state variables keep track of the number of VoIP RABs currently using specific DRX parameters. If the RAC 34 instead receives a notification of an outgoing VoIP RAB (step 1206), the RAC 34 skips to step 1204 and updates the VoIP-DRX parameter state machine 36.

Figure 20:
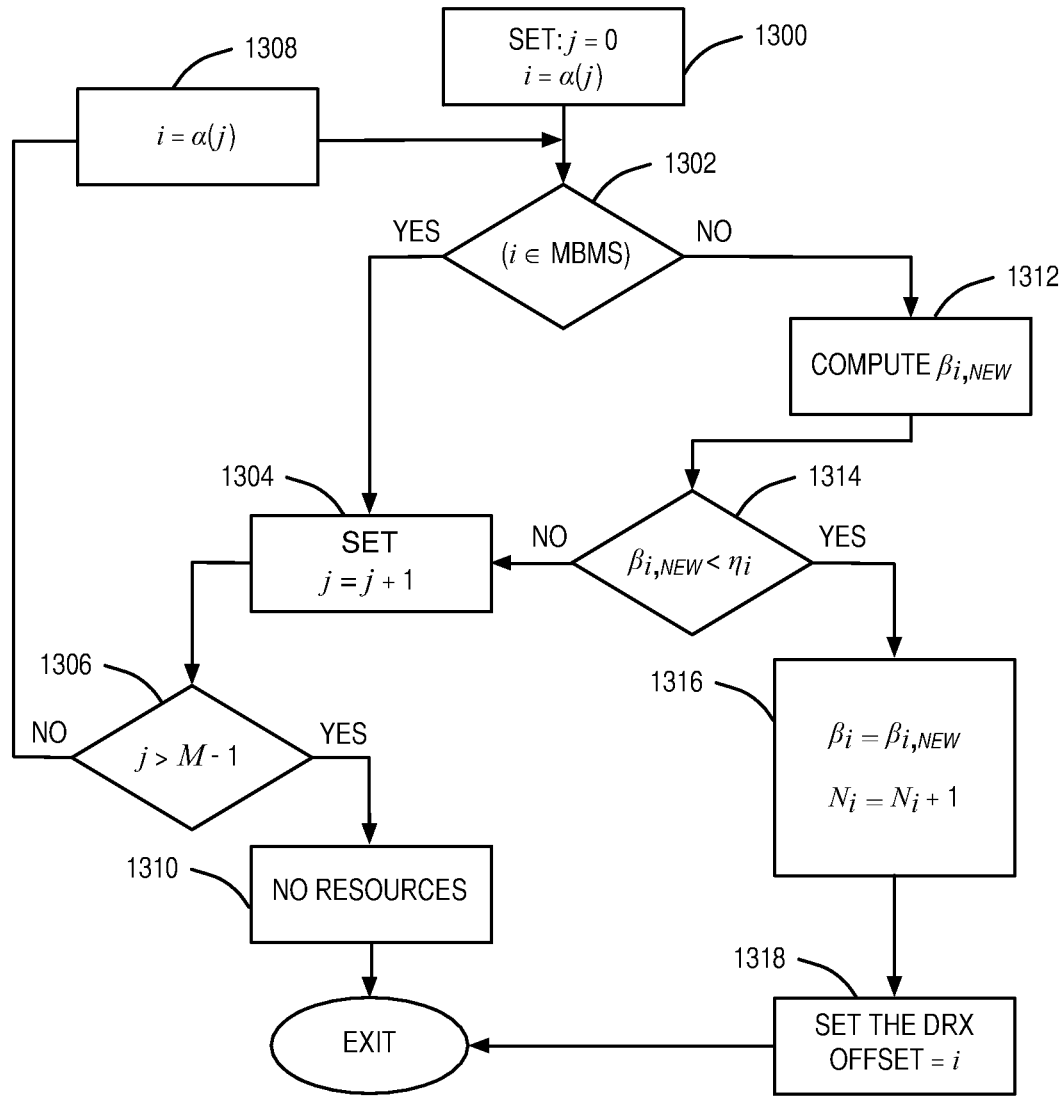
FIG. 20 illustrates the operation of the VoIP-DRX parameter state machine of the RAC of FIG. 17 for determining a suitable DRX offset according to one embodiment of the present disclosure.

As mentioned previously, the RAC 34 may take into account many different factors in finding a suitable value for a DRX offset parameter for an incoming VoIP RAB. One of these factors can be the maximum number of VoIP RABs that share the same DRX offset value. The maximum number of VoIP RABs with the same DRX offset is decided based on, e.g., the expected number of simultaneously active VoIP RABs. The number of simultaneously active VoIP RABs can be estimated with the knowledge of, e.g., the voice activity factor. The voice activity factor is the proportion of time a VoIP RAB is likely to be active. The voice activity factor can either be empirically calculated from the type of vocoder used, it can be learned from field measurements, or by some other method. In this regard, FIG. 20 illustrates the operation of the VoIP-DRX parameter state machine 36 of the RAC 34 of FIG. 17 for determining a suitable DRX offset for an incoming VoIP RAB according to one embodiment of the present disclosure. The RAC 34 first initializes a counter j to zero and uses j to select a first DRX offset value i using the function $\alpha(j)$ (step 1300). The function $\alpha(j)$ merely allows the various DRX offset values to be chosen in, e.g., an arbitrary order. For example, $\alpha(j)$ may select values from a predefined set of possible DRX offset values in a sequential order, $\alpha(j)$ may select values from a predefined set of possible DRX offset values in a random order, or $\alpha(j)$ may select values from a predefined, sorted list of possible DRX offset values. As one particular example, the DRX offset values may be ordered in the decreasing order of $\beta_i - \eta_i$ (where $\beta_i$ is the probability that DRX offset i will be overloaded and $\eta_i$ is the threshold for probability of DRX offset i which would make DRX offset i unsuitable. In another example, the DRX offset values may be ordered based on the Channel Quality Indicator (CQI) of the incoming VoIP UE and the average radio resource availability in the subframe corresponding to the DRX offset value.

The RAC 34 then checks to see if the DRX offset value i is in the set of MBMS subframes (step 1302). In an embodiment where MBMS subframe information is not used, this step can be omitted. Also, in other embodiments, this step can check for any type of special subframe which should be avoided when scheduling an incoming VoIP RAB. If the DRX offset value i is in the set of MBMS subframes, the RAC 34 will skip this DRX offset value because it is unsuitable. Thus, the RAC 34 increments the counter j by 1 (step 1304) and check to see if all DRX offsets have been evaluated (step 1306). The DRX offset value i is also updated using the function $\alpha(j)$ (step 1308). If all DRX offsets have been evaluated and none have been found suitable, the RAC 34 determines that there are no resources available (step 1310) and denies the request for the incoming VoIP RAB. If there are still DRX offset values to be evaluated, the method returns to step 1302 with the updated j and the updated $\alpha(j)$.

Returning to step 1302, if the DRX offset value is not in the set of MBMS subframes, the RAC 34 computes a value $\beta_{i,NEW}$ (step 1312). $\beta_{i,NEW}$ is the probability that, by adding the incoming VoIP RAB to the DRX offset i, the number of simultaneously active VoIP RABs with DRX offset of i will be greater than the maximum allowed by the system. This is also referred to as the probability of overloading the DRX offset. The RAC 34 then compares the value $\beta_{i,NEW}$ to a threshold value of $\eta_i$ (step 1314). If the probability of overloading the DRX offset i is not less than the threshold (i.e., is greater than or equal to) for that DRX offset value, that DRX offset value is rejected and the RAC 34 tries another value. If the probability of overloading the DRX offset i is less than the threshold $\eta_i$ for that DRX offset value, the state variables for that DRX offset are updated (step 1316) and the RAC 34 sets the DRX offset of the incoming VoIP RAB to be i (step 1318). The thresholds, $\eta_i$ may be set such that more VoIP RABs are allowed on DRX offset i if the immediately following subframes are allowed to take VoIP users or do not contain MBMS or special or restricted subframes.

For example, may be selected from four values $\{\Gamma_0, \Gamma_1, \Gamma_2, \Gamma_3\}$, where $\Gamma_i < \Gamma_{i+1}$. In this example, i values are limited to only four values assuming that the Key Performance Indicator (KPI) (such as a packet loss factor or a jitter factor) is not acceptable after 4 ms of delay/jitter. In this example, if the VoIP RAB is evaluated for the DRX offset i and the (i+1)th subframe is a restricted subframe, then $\eta_i$ is set to $\Gamma_0$. In general, if the VoIP RAB is evaluated for the DRX offset i and the (i+b)th subframe is a restricted subframe, then $\eta_i$ is set to $\Gamma_{b-1}$.

Figure 21:
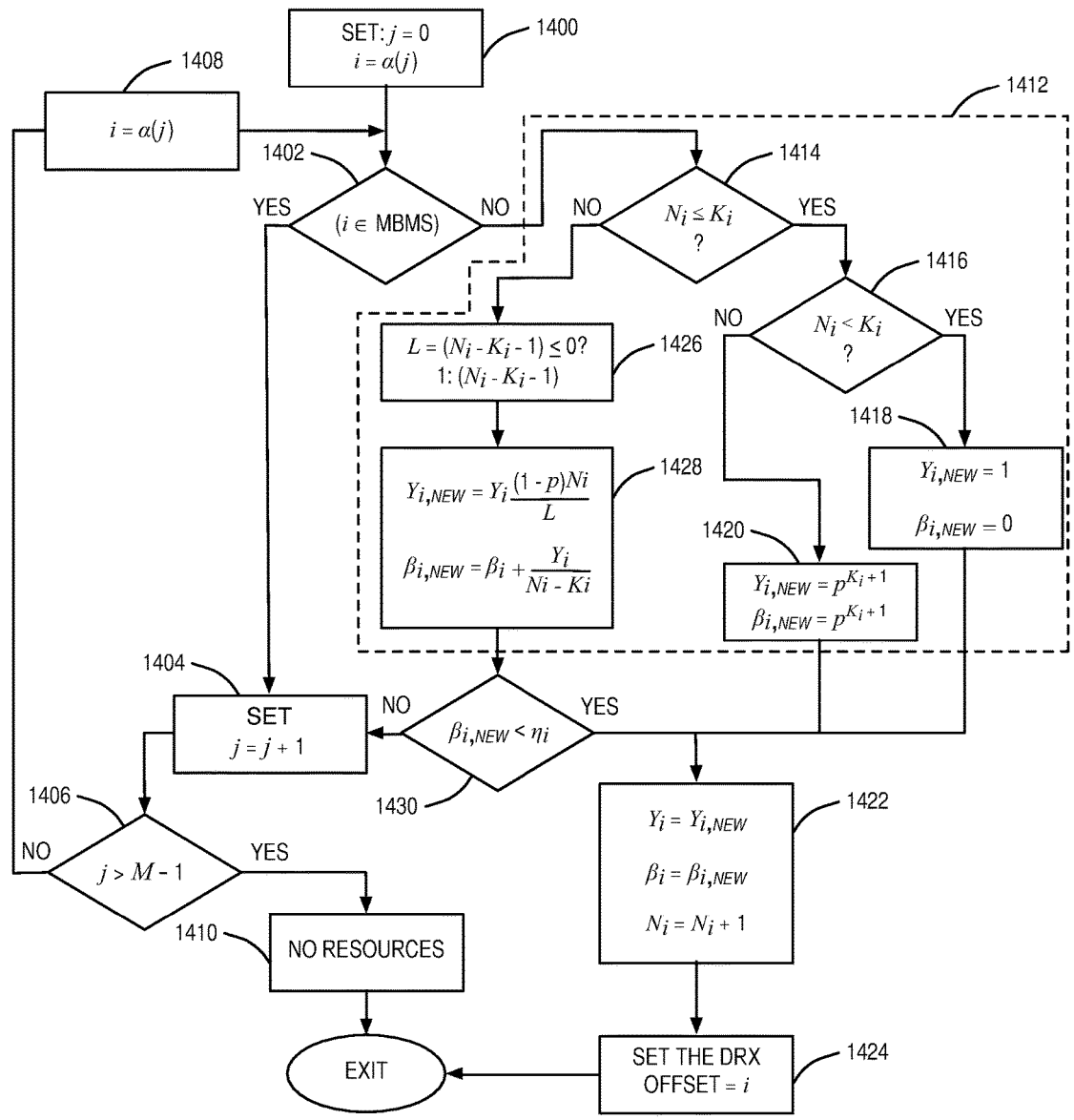
FIG. 21 illustrates the operation of the VoIP-DRX parameter state machine of FIG. 20 for determining the probability of overloading a DRX offset according to one embodiment of the present disclosure.

FIG. 21 illustrates the operation of the VoIP-DRX parameter state machine 36 of FIG. 20 for determining the probability of overloading a DRX offset according to one embodiment of the present disclosure. The method of FIG. 21 is similar to that of FIG. 20. The primary difference is that FIG. 21 illustrates one embodiment of the computation of the probability of overloading the DRX offset value (step 1310 of FIG. 20) in more detail. These details are only one possible embodiment of the computations and are not intended to limit the scope of this disclosure. The formulas assume that the number of simultaneously active VoIP RABs on a given DRX offset value will follow a binomial distribution with the voice activity factor as the probability of a single event. The formulas are further arranged to facilitate incremental computation of the probabilities. This is an implementation decision that will require fewer resources at each individual update stage but may not be the most efficient means of computing the probabilities. Another difference between the method of FIG. 21 and FIG. 20 is that the method of FIG. 21 includes an additional value to store in the VoIP-DRX parameter state machine 36 to facilitate the incremental calculation of the probabilities.

The RAC 34 first initializes a counter j to zero and uses j to select a first DRX offset value i using the function $\alpha(j)$ (step 1400). As before, the function $\alpha(j)$ allows the various DRX offset values to be chosen in an arbitrary order. The RAC 34 then checks to see if the DRX offset value i is in the set of MBMS subframes (step 1402). If the DRX offset value i is in the set of MBMS subframes, the RAC 34 will skip this DRX offset value because it is unsuitable. The RAC 34 will then increment the counter j by 1 (step 1404) and check to see if all DRX offsets have been evaluated (step 1406). The DRX offset value i is also updated using the function $\alpha(j)$ (step 1408). If all DRX offsets have been evaluated and none have been found suitable, the RAC 34 determines that there are no resources available (step 1410) and denies the request for the incoming VoIP RAB. If there are still DRX offset values to be evaluated, the method returns to step 1402 with the updated j and the updated $\alpha(j)$.

Returning to step 1402, if the DRX offset value i is not in the set of MBMS subframes, the RAC 34 determines if the DRX offset value i is suitable in a manner analogous to step 1310 of FIG. 20 (steps 1412). More specifically, the RAC 34 first determines if the number of VoIP RABs currently using the DRX offset value i ($N_i$) is less than or equal to the maximum allowable simultaneously active VoIP RABs for the DRX offset value ($K_i$) (step 1414). $K_i$ may be provisioned based on, e.g., the system load and VoIP quality. Alternatively, $K_i$ may be derived dynamically. If $N_i \leq K_i$ shortcuts in computation and decision can be made. Specifically, if $N_i \leq K_i$, the DRX offset value i cannot be overloaded. Therefore, if $N_i \leq K_i$, then the RAC 34 does not need to check for the probability of overload, but only needs to update the state variables that will aid in the possible computation of future overload probabilities. Thus, as illustrated, if $N_i \le K_i$, the RAC 34 first checks if $N_i$ is strictly less than $K_i$ (step 1416). If $N_i$ is strictly less than $K_i$, then even after adding this new VoIP RAB, there will be a zero probability of overloading the DXR offset value. As such, $Y_{i,NEW}$ is set to 1 and $\beta_{i,NEW}$ is set to 0 since there is a zero probability that the DRX offset will be overloaded (step 1418). $Y_i$ is a scaling factor to enable the incremental computation of the binomial probabilities. If $N_i$ is not strictly less than $K_i$, then they are currently equal. In this case, both $Y_{i,NEW}$ and $\beta_{i,NEW}$ are set to the binomial calculation of the probability that all of the $K_{i+1}$ VoIP RABs are active simultaneously (step 1420).

Returning to step 1414, if $N_i$ is greater than $K_i$, then there is a possibility that the DRX offset value could be overloaded by adding another VoIP RAB with that DRX offset value. In this case, the value L is first computed to use as an incremental factor to relate the previous probability with the new one. Here, L is set to 1 if $N_i-K_i-1$ is less than or equal to zero and L is set to $N_i-K_i-1$ otherwise (step 1426). Next, the values of $Y_{i,NEW}$ and $\beta_{i,NEW}$ are computed based on the incremental binomial probability calculation (step 1428). In this embodiment, these values can be computed as $$\beta_{i,NEW} = \beta_i + \frac{\gamma_i}{N_i - K_i}$$

and $$\gamma_{i,NEW} = \gamma_i \frac{(1-p)N_i}{L}.$$

Here p is the voice activity factor and set to a value between 0 and 1. A typical value for voice activity is between 0.4 and 0.5. Now, as with the method in FIG. 20, the RAC 34 then compares the value $\beta_{i,NEW}$ to a threshold value of $\eta_i$ (step 1430). If the probability of overloading the DRX offset value i is not less than (i.e., greater than) the threshold $\eta_i$ for that DRX offset value i, then the DRX offset value i is rejected, and the RAC 34 proceeds to step 1404, as discussed above. However, if the probability of overloading the DRX offset value i is less than the threshold $\eta_i$ for that DRX offset value i or if the process is proceeding from either step 1418 or 1420, the state variables for that DRX offset are updated (step 1422), and the RAC 34 sets the DRX offset of the incoming VoIP RAB to be i (step 1424).

Figure 22:
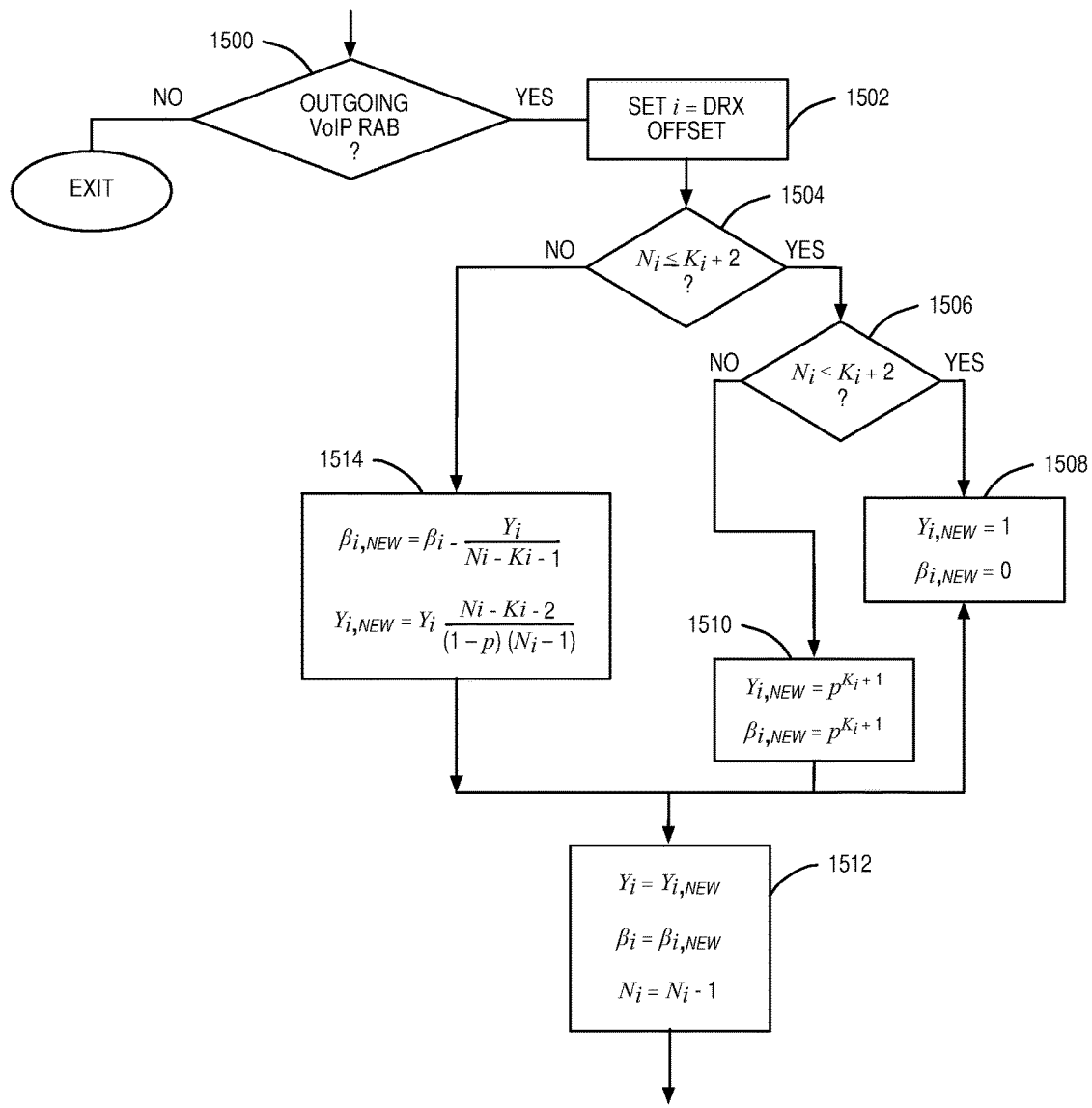
FIG. 22 illustrates the operation of the VoIP-DRX parameter state machine of the RAC of FIG. 17 with an outgoing VoIP RAB according to one embodiment of the present disclosure.

In order for the RAC 34 to be able to properly compute the probability of overloading a DRX offset value, the RAC 34 must also update the VoIP-DRX parameter state machine 36 when a VoIP RAB exits the system. FIG. 22 illustrates the operation of the VoIP-DRX parameter state machine 36 of the RAC 34 of FIG. 17 with an outgoing VoIP RAB according to one embodiment of the present disclosure. First, the RAC 34 checks if there is an outgoing VoIP RAB (step 1500). If there is not, the process exits. Otherwise, the RAC 34 sets the variable i to the value of the DRX offset of the outgoing VoIP RAB (step 1502). This is the DRX offset value that will need to have state parameters adjusted. In one embodiment, the number of VoIP RABs currently assigned to that DRX offset value will be decremented by one. But because of the incremental calculations of the overload probabilities, the other state parameters also need to be recomputed to take into account the smaller number. Similarly to the way that different cases of numbers allow for shortcuts in the state parameter calculations in the method of FIG. 21, the RAC 34 first tests if $N_i$ is less than or equal to $K_i+2$ (step 1504). If it is, the RAC 34 tests if $N_i$ is strictly less than $K_{i+2}$ (step 1506). In this case, $Y_{i,NEW}$ is set to 1 and $\beta_{i,NEW}$ is set to 0 since there is a zero probability that the DRX offset will be overloaded (step 1508). If $N_i$ is equal to $K_i$2, then after removing this VoIP RAB the state will be the same as for step 1418 in FIG. 21 and both $Y_{i,NEW}$ and $\beta_{i,NEW}$ are set to the simple binomial calculation of the probability that all of the $K_i+1$ VoIP RABs are active simultaneously (step 1510).

If $N_i$ is greater than $K_1+2$, then the values of $Y_{i,NEW}$ and $\beta_{i,NEW}$ are computed based on the incremental binomial probability calculation as the inverse of step 1426 (step 1514). The state variables for that DRX offset are then updated (step 1512). In an alternate procedure, $N_i$ can be decremented by '1', i.e. $N_i=N_i-1$ before step 1504 and in the subsequent steps for the DRX state updates can be modified accordingly.

In one embodiment, if the MBMS configuration is changed, then the outlined procedures for determining suitable DRX offset values may be rerun for all the VoIP RABs (preferably in the order of their priority). During this reassignment, an additional criterion may be used to reduce the change in the DRX offset for the existing VoIP RABs to the minimum (or within a prescribed limit, for example <2 or 3 ms).

Figure 23:
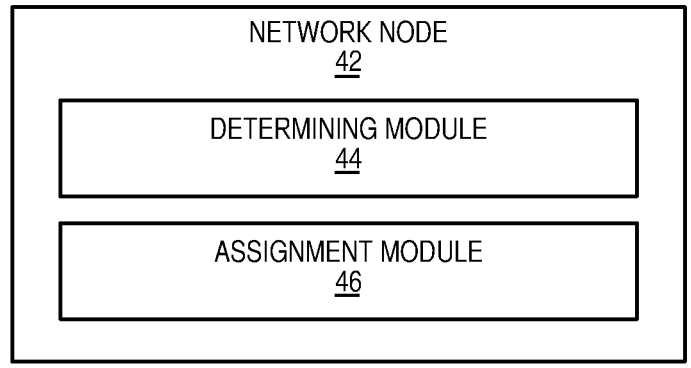
FIG. 23 is a block diagram of a determining module and an assignment module according to one embodiment of the present disclosure.

FIG. 23 illustrates a network node 42 according to another embodiment of the present disclosure. The network node 42 may be, for example, MME 22, MCE 24, or eNB 26. As illustrated, the network node 42 includes a determining module 44 and an assignment module 46 that are each implemented in software that, when executed by a processor of the network node 42, causes the network node 42 to operate according to one of the embodiments described herein. The determining module 44 operates to determine the number of MBMS subframes to be assigned, as described above with respect to the determining steps 200, 300 or 400. The assignment module 46 operates to assign frame numbers and subframe numbers for the MBMS subframes as discussed above with respect to, for example, steps 204-208, 304-310, and 404-426.

Figure 24:
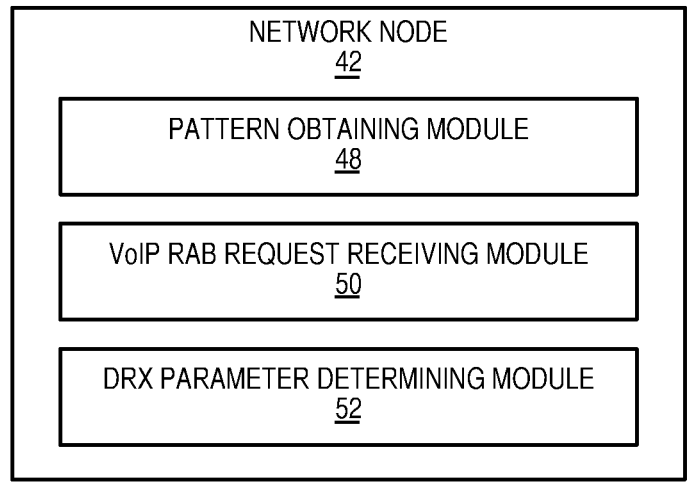
FIG. 24 is a block diagram of a pattern obtaining module, a VoIP RAB request receiving module, and a DRX parameter determining module according to one embodiment of the present disclosure.

FIG. 24 illustrates a network node 42 according to another embodiment of the present disclosure. As illustrated, the network node 42 includes a pattern obtaining module 48, a VoIP RAB request receiving module 50, and a DRX parameter determining module 52 that are each implemented in software and, when executed by a processor of the network node 42, cause the network node 42 to operate according to one of the embodiments described herein. The pattern obtaining module 48 operates to provide the functionality of the network node 42 with respect to the pattern obtaining process 600, 700, 800, 900 or 1000 described above. Likewise, the VoIP RAB request receiving module 50 operates to provide the functionality of the network node 42 with respect to the VoIP RAB request receiving process 602, 702, 802, 902 or 1002 described above. The DRX parameter determining module 52 operates to provide the functionality of the network node 42 with respect to the DRX parameter determining process 604, 704, 804, 906, 908 or 1006 described above.

Figure 25:
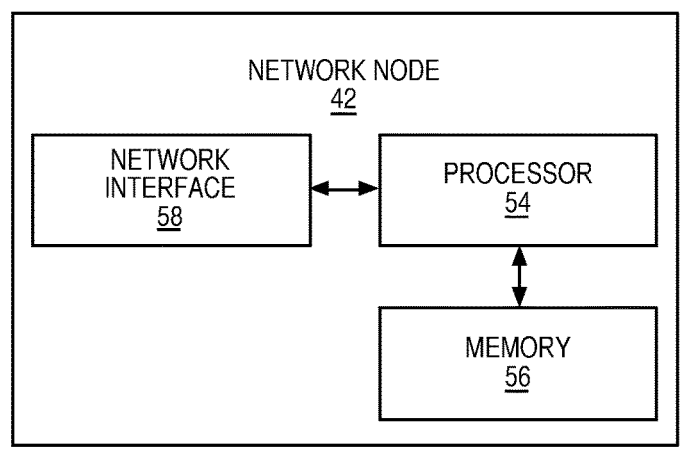
FIG. 25 is a block diagram of a network node according to one embodiment of the present disclosure.

FIG. 25 is a block diagram of a network node 42 according to one embodiment of the present disclosure. As illustrated, the network node 42 includes a processor 54, memory 56, and a network interface 58. In one embodiment, the network node 42, or the functionality of the network node 42 described with respect to any one of the embodiments described herein, is implemented in software that is stored in, e.g., the memory 56 and executed by the processor 54. The network interface 58 may include one or more components (e.g., network interface card(s)) that connect the network node 42 to other systems.

In one embodiment, a computer program including instructions which, when executed by at least one processor, causes the at least one processor to carry out the functionality of the network node 42 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 56).

Figure 26:
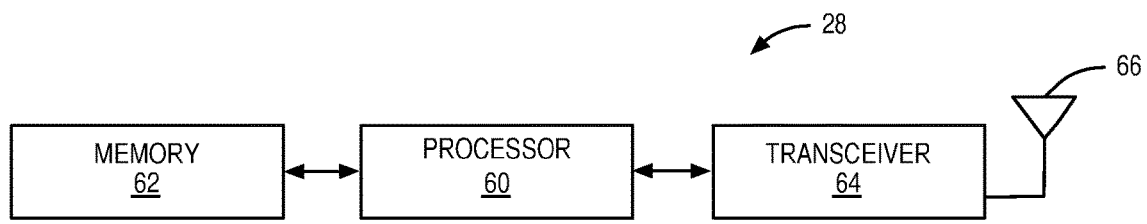
FIG. 26 is a block diagram of a user equipment (UE) according to one embodiment of the present disclosure.

FIG. 26 is a block diagram of a UE 28 according to one embodiment of the present disclosure. As illustrated, the UE 28 includes a processor 60, memory 62, a transceiver 64, and at least one antenna 66. In one embodiment, UE 28, or the functionality of the UE 28 described with respect to any one of the embodiments described herein, is implemented in software that is stored in, e.g., the memory 62 and executed by the processor 60. The transceiver 64 uses the at least one antenna 66 to transmit and receive signals and may include one or more components that connect the UE 28 to other systems.

In one embodiment, a computer program including instructions which, when executed by at least one processor, causes the at least one processor to carry out the functionality of the UE 28 according to any one of the embodiments described herein is provided. In one embodiment, a carrier containing the aforementioned computer program product is provided. The carrier is one of an electronic signal, an optical signal, a radio signal, or a computer readable storage medium (e.g., a non-transitory computer readable medium such as the memory 62).

The following acronyms are used throughout this disclosure.

3GPP 3rd Generation Partnership Project
 ABS Almost Blank Subframes
 CQI Channel Quality Indicator
 DRX Discontinuous Reception
 eNB Evolved (or Enhanced) Node B
 FDD Frequency Division Duplex
 GBR Guaranteed Bit Rate
 IE Information Element
 IP Internet Protocol
 KPI Key Performance Indicator
 LTE Long Term Evolution
 MBMS Multimedia Broadcast Multicast Service
 MBSFN Multicast-Broadcast Single-Frequency Network
 NCT New Carrier Type
 PDCCH Physical Downlink Common Control Channel
 PRS Positioning Reference Signals
 QoS Quality of Service
 RAB Radio Access Bearer
 RAC Radio Access Control
 RRC Radio Resource Control
 RRM Radio Resource Management
 SIB2 System Information Block 2
 TDD Time Division Duplex
 UE User Equipment
 VoIP Voice over IP
 VoLTE Voice over LTE Those skilled in the art will recognize improvements and modifications to the embodiments of the present disclosure. All such improvements and modifications are considered within the scope of the concepts disclosed herein and the claims that follow.

What is claimed is:

1. A method of operation of a network node in a cellular communications network, comprising:
   obtaining a pattern of special subframes where the special subframes in the pattern of special subframes are selected from the group consisting of Multimedia Broadcast Multicast Service, MBMS, subframes, Almost Blank Subframes, ABS, New Carrier Type, NCT, subframes, and subframes assigned for Positioning Reference Signals, PRS;
   receiving a request for a Voice over Internet Protocol, VoIP, Radio Access Bearer, RAB, from a user equipment, UE; and
   determining one or more discontinuous reception, DRX, parameters for the VoIP RAB based on the pattern of special subframes.

2. The method of claim 1 wherein determining the one or more DRX parameters for the VoIP RAB comprises determining the one or more DRX parameters for the VoIP RAB based on the pattern of special subframes such that a performance metric is optimized.

3. The method of claim 1 wherein determining the one or more DRX parameters for the VoIP RAB comprises determining the DRX offset parameter for the VoIP RAB based on the pattern of special subframes.

4. The method of claim 3 wherein determining the DRX offset parameter for the VoIP RAB comprises determining the DRX offset parameter for the VoIP RAB based on the pattern of special subframes such that packet delay for the VoIP RAB is reduced as compared to the packet delay for the VoIP RAB with a DRX offset parameter not determined based on the pattern of special subframes.

5. The method of claim 1 wherein determining the DRX offset parameter for the VoIP RAB comprises determining a DRX offset parameter for the VoIP RAB such that, for each special subframe in the pattern of special subframes, the DRX offset parameter will not coincide with the special subframe.

6. The method of claim 1 wherein determining the DRX offset parameter for VoIP RAB comprises determining the DRX offset parameter for the VoIP RAB such that a probability of subframe numbers which satisfy the criterion DRX offset=mod(subframe number, DRX period) being a special subframe is less than a threshold.

7. The method of claim 6 wherein the threshold is defined based on a VoIP packet delay budget.

8. The method of claim 6 wherein the threshold is dependent on the probability that the subframe numbers which satisfy the criterion DRX offset+n=mod(subframe number, DRX period) being a special subframe, where n is less than DRX ON TIME.

9. The method of claim 1 wherein determining the one or more DRX parameters for the VoIP RAB comprises determining a DRX ON TIME parameter for the VoIP RAB based on the pattern of special subframes such that power use for the UE is reduced as compared to the power use for the UE with a DRX ON TIME parameter not determined based on the pattern of special subframes.

10. The method of claim 9 wherein determining the DRX ON TIME parameter for the VoIP RAB comprises determining the DRX ON TIME parameter for the VoIP RAB based on the pattern of special subframes such that power use for the UE is reduced as compared to the power use for the UE with the DRX ON TIME parameter not determined based on the pattern of special subframes.

11. The method of claim 9 wherein determining the DRX ON TIME parameter for the VoIP RAB comprises:
determining whether one or more special subframes in the pattern of special subframes are scheduled to be received immediately after the VoIP RAB is scheduled to be received;
if no special subframes in the pattern of special subframes are scheduled to be received immediately after the VoIP RAB is scheduled to be received, setting the DRX ON TIME parameter for the VoIP RAB to a minimum value for the DRX ON TIME parameter; and
if the one or more special subframes in the pattern of special subframes are scheduled to be received immediately after the VoIP RAB is scheduled to be received, setting the DRX ON TIME parameter for the VoIP RAB to a value greater than the minimum value for the DRX ON TIME parameter.

12. The method of claim 1 wherein determining the one or more DRX parameters for the VoIP RAB comprises:
selecting a value for a DRX offset parameter for the VoIP RAB;
determining whether the value for the DRX offset parameter for the VoIP RAB is suitable; and
in response to determining that the value is suitable, setting the DRX offset parameter for the VoIP RAB to the value.

13. The method of claim 12 wherein selecting the value for the DRX offset parameter for the VoIP RAB comprises randomly selecting the value for the DRX offset parameter for the VoIP RAB.

14. The method of claim 12 wherein selecting the value for the DRX offset parameter for the VoIP RAB comprises selecting the value for the DRX offset parameter for the VoIP RAB from a sorted list of values.

15. The method of claim 14 wherein the sorted list of values is sorted by a probability that each value is suitable.

16. The method of claim 14 wherein the sorted list of values is sorted by an average resource availability.

17. The method of claim 12 wherein determining whether the value for the DRX offset parameter for the VoIP RAB is suitable comprises determining that the value is not suitable if the value corresponds to a special subframe in the pattern of special subframes.

18. The method of claim 17 wherein determining whether the value for the DRX offset parameter for VoIP RAB is suitable comprises determining if the DRX offset parameter for the VoIP RAB such that a probability of subframe numbers which satisfy the criterion DRX offset=mod(subframe number, DRX period) being a special subframe is less than a threshold.

19. The method of claim 12 wherein determining whether the value for the DRX offset parameter for the VoIP RAB is suitable comprises determining that the value is not suitable and the method further comprises determining whether setting the DRX offset parameter for the VoIP RAB to the value would cause an overload condition.

20. The method of claim 19 wherein determining whether setting the DRX offset parameter for the VoIP RAB to the value would cause an overload condition comprises:
determining a probability that setting the DRX offset parameter for the VoIP RAB to the value would cause a number of simultaneously active VoIP RABs to exceed a maximum number of simultaneously active VoIP RABs allowed; and
determining that the value is not suitable if the probability exceeds a threshold.

21. The method of claim 20 wherein determining the probability that setting the DRX offset parameter for the VoIP RAB to the value would cause the number of simultaneously active VoIP RABs to exceed the maximum number of simultaneously active VoIP RABs comprises determining the probability that setting the DRX offset parameter for the VoIP RAB to the value would cause the number of simultaneously active VoIP RABs to exceed the maximum number based on a number of VoIP RABs having a DRX offset parameter set to the value and a voice activity factor that is the proportion of time a VoIP RAB is likely to be active.

22. The method of claim 12 further comprising:
in response to determining that the value for the DRX offset parameter for the VoIP RAB is not suitable, repeating the selecting, determining, and setting steps with a new value for the DRX offset parameter for the VoIP RAB that is different from the value.

23. The method of claim 12 further comprising:
determining that no value is suitable for the DRX offset parameter for the VoIP RAB; and
in response to determining that no value is suitable for the DRX offset parameter for the VoIP RAB, denying the request for the VoIP RAB.

24. The method of claim 1 wherein the cellular communications network is a Long Term Evolution, LTE, network.

25. A network node in a cellular communications network, comprising:
a processor; and
a memory coupled to the processor, the memory containing instructions executable by the processor whereby the network node is operative to:
obtain a pattern of special subframes where the special subframes in the pattern of special subframes are selected from the group consisting of Multimedia Broadcast Multicast Service, MBMS, subframes, Almost Blank Subframes, ABS, New Carrier Type, NCT, subframes, and subframes assigned for Positioning Reference Signals, PRS;
receive a request for a Voice Over Internet Protocol, VoIP, Radio Access Bearer, RAB, from a user equipment, UE; and
determine one or more discontinuous reception, DRX, parameters for the VoIP RAB based on the pattern of special subframes.

26. The network node of claim 25 wherein the network node is operative to determine the one or more DRX parameters for the VoIP RAB by being operative to determine the one or more DRX parameters for the VoIP RAB based on the pattern of special subframes such that a performance metric is optimized.

* * * * *